(12) United States Patent
Schilt et al.

(10) Patent No.: US 10,712,555 B2
(45) Date of Patent: Jul. 14, 2020

(54) STREAMING VIRTUAL REALITY VIDEO

(71) Applicants: Koninklijke KPN N.V., Rotterdam (NL); Nederlandse Organisatie Voor Toegepast-Natuurwetenschappelijk Onderzoek TNO, s-Gravenhage (NL)

(72) Inventors: Gerrit Schilt, The Hague (NL); Hans Maarten Stokking, Wateringen (NL); Anne-Marie Brouwer, Amersfoort (NL); Jasper Sebastiaan Van Der Waa, Zeist (NL); Maarten Andreas Hogervorst, Utrecht (NL)

(73) Assignees: KONINKLIJKE KPN N.V., Rotterdam (NL); NEDERLANDSE ORGANISATIE VOOR TOEGEPAST—NATUURWETENS-CHAPPELIJK ONDERZOEK TNO, 'S Gravenhage (NL)

( * ) Notice: Subject to any disclaimer, the term of this patent is extended or adjusted under 35 U.S.C. 154(b) by 0 days.

(21) Appl. No.: 16/345,544

(22) PCT Filed: Nov. 3, 2017

(86) PCT No.: PCT/EP2017/078130
§ 371 (c)(1),
(2) Date: Apr. 26, 2019

(87) PCT Pub. No.: WO2018/083211
PCT Pub. Date: May 11, 2018

(65) Prior Publication Data
US 2019/0310472 A1 Oct. 10, 2019

(30) Foreign Application Priority Data
Nov. 4, 2016 (EP) .................................... 16197381

(51) Int. Cl.
G06F 15/173 (2006.01)
G02B 27/00 (2006.01)
(Continued)

(52) U.S. Cl.
CPC ......... G02B 27/0093 (2013.01); G06F 3/012 (2013.01); G06F 3/015 (2013.01);
(Continued)

(58) Field of Classification Search
CPC .... G02B 27/0093; G06F 3/12; H04N 19/597; H04N 21/00; H04N 21/23439; H04N 21/2662; H04N 21/2665
See application file for complete search history.

(56) References Cited

U.S. PATENT DOCUMENTS 9,210,200 B1 12/2015 Chapweske
9,538,160 B1 1/2017 Cole et al.
(Continued)

FOREIGN PATENT DOCUMENTS

EP 1 826 978 A1 8/2007
WO 2015197815 A1 12/2015
(Continued)

OTHER PUBLICATIONS

European Search Report for European Application No. EP 16197381.3, titled: Streaming Virtual Reality Video, Date of Completion: Apr. 11, 2017.
(Continued)

Primary Examiner — Thanh T Nguyen
(74) Attorney, Agent, or Firm — Hamilton, Brook, Smith & Reynolds, P.C.

(57) ABSTRACT

Methods and devices are provided for use in a streaming process (130) of a Virtual Reality [VR] video to a VR rendering device (120). The streaming process has a configurable setup, each configured setup providing respective
(Continued)

different image data of a scene. The VR rendering device is arranged to render a current view of the scene based on a current head position. The streaming process is executed according to a first configured setup providing first image data needed to render the current view. EEG data is determined by measuring brain signals (115) and a head movement is predicted based on the EEG data. Target image data is determined as needed for rendering a future view based on the predicted head movement. A new configured setup for providing the target image data is determined. By adapting the streaming process based on the prediction the target image data can be provided in time and efficiently using available bandwidth.

17 Claims, 26 Drawing Sheets

(51) Int. Cl.
    *H04N 19/597*     (2014.01)
    *G06F 3/01*     (2006.01)
    *H04N 21/2343*     (2011.01)
    *H04N 21/2662*     (2011.01)
    *H04N 21/2665*     (2011.01)
    *H04N 21/00*     (2011.01)

(52) U.S. Cl.
    CPC .......... *H04N 19/597* (2014.11); *H04N 21/00* (2013.01); *H04N 21/23439* (2013.01); *H04N 21/2662* (2013.01); *H04N 21/2665* (2013.01)

(56) References Cited

U.S. PATENT DOCUMENTS

| | | | |
|---|---|---|---|
| 9,578,356 B1 | 2/2017 | Lin et al. | |
| 10,320,691 B1 | 6/2019 | Matthews | |
| 10,460,700 B1 | 10/2019 | Mendhekar | |
| 2004/0071083 A1 | 4/2004 | Li et al. | |
| 2007/0064689 A1 | 3/2007 | Shin et al. | |
| 2010/0074594 A1 | 3/2010 | Nakamura | |
| 2012/0131146 A1 | 5/2012 | Choi et al. | |
| 2012/0242781 A1 | 9/2012 | Gautier et al. | |
| 2013/0060911 A1 | 3/2013 | Nagaraj et al. | |
| 2014/0028798 A1 | 1/2014 | Tsukagoshi | |
| 2014/0063187 A1 | 3/2014 | Tsukagoshi | |
| 2014/0071236 A1 | 3/2014 | Tsukagoshi | |
| 2014/0089500 A1 | 3/2014 | Sankar | |
| 2014/0098185 A1 | 4/2014 | Davari | |
| 2014/0098186 A1 | 4/2014 | Seidl | |
| 2014/0125762 A1 | 5/2014 | Tsukagoshi | |
| 2014/0152834 A1 | 6/2014 | Kosseifi | |
| 2014/0300532 A1* | 10/2014 | Karkkainen | G06F 3/015 345/156 |
| 2015/0197815 A1* | 7/2015 | Kural | C12Q 1/6886 506/2 |
| 2015/0254882 A1 | 9/2015 | Englert | |
| 2015/0302651 A1 | 10/2015 | Shpigelman | |
| 2015/0346812 A1 | 12/2015 | Cole et al. | |
| 2015/0346832 A1 | 12/2015 | Cole et al. | |
| 2016/0006673 A1 | 1/2016 | Thomas | |
| 2016/0044095 A1 | 2/2016 | Sankar | |
| 2016/0094641 A1 | 3/2016 | Rahman | |
| 2016/0095043 A1 | 3/2016 | Maria | |
| 2016/0101356 A1 | 4/2016 | Kuo | |
| 2016/0104510 A1 | 4/2016 | Tamir | |
| 2016/0115983 A1* | 4/2016 | Rock | F16B 7/0413 403/292 |
| 2016/0337206 A1 | 11/2016 | Bugenhagen | |
| 2016/0373546 A1* | 12/2016 | Lotfallah | H04L 65/4084 |
| 2017/0078447 A1 | 3/2017 | Hancock | |
| 2017/0085501 A1 | 3/2017 | Utgikar | |
| 2017/0289219 A1 | 10/2017 | Khalid | |
| 2017/0318360 A1 | 11/2017 | Tran | |
| 2017/0339415 A1 | 11/2017 | Wang | |
| 2017/0347163 A1* | 11/2017 | Wang | G06T 9/00 |
| 2017/0366605 A1 | 12/2017 | Chang | |
| 2018/0020204 A1 | 1/2018 | Pang | |
| 2018/0035134 A1 | 2/2018 | Pang | |
| 2018/0240276 A1* | 8/2018 | He | G06T 3/0087 |
| 2018/0350146 A1 | 12/2018 | Gervasio | |
| 2019/0089643 A1 | 3/2019 | Westphal | |
| 2019/0158815 A1 | 5/2019 | He | |
| 2019/0230142 A1 | 7/2019 | He | |
| 2019/0238861 A1 | 8/2019 | D'Acunto | |
| 2019/0310472 A1 | 10/2019 | Schilt | |
| 2019/0313160 A1 | 10/2019 | Stokking | |
| 2019/0362151 A1 | 11/2019 | Stokking | |

FOREIGN PATENT DOCUMENTS

| | | |
|---|---|---|
| WO | 2016/115983 A1 | 7/2016 |
| WO | 2018011054 A1 | 2/2018 |
| WO | 2018050606 A1 | 3/2018 |

OTHER PUBLICATIONS

International Search Report and Written Opinion for Int'l Application No. PCT/EP2017/078130, titled: Streaming Virtual Reality Video, dated Feb. 26, 2018.

Barniv, Yair et al., "Using EMG to Anticipate Head Motion for Virtual-Environment Applications," IEEE Transactions on Biomedical Engineering, vol. 52, No. 6, pp. 1078-1093 (Jun. 2005).

Gheorghe, Lucian et al., "Steering Timing Prediction in a Driving Simulator Task," 2013 35th Annual International Conference of the IEEE Engineering in Medicine and Biology Society (EMBC), Jul. 3-7, 2013, Osaka, Japan, 4 pages.

Haufe, Stefan et al., "Electrophysiology-based detection of emergency braking intention in real-world driving," J. Neural Eng., 11: 1-8 (2014).

Lew, Eileen et al., "Detection of self-paced reaching movement intention from EEG signals," Frontiers in Neuroengineering, vol. 5, Article 13: 1-17 (Jul. 2012).

Ochi, Daisuke et al., "Live Streaming System for Omnidirectional Video," IEEE Virtual Reality Conference 2015, Mar. 23-27, 2015, Arles, France, pp. 349-350.

Wang, Ye-Kui et al., "Signaling of most-interested regions of VR video," MPEG Meeting, Geneva, No. m38560, May 25, 2016, 3 pages.

"3rd Generation Partnership Project; Technical Specification Group Services and System Aspects; Study on Server And Network-assisted DASH (SAND) for 3GPP Multimedia Services (Release 14)," 3rd Generation Partnership Project, Sophia-Antipolis Cedex, France, 42 pages (2016).

Advani et al., "Optimizing Video Delivery using OpenFlow," Capston Final Paper, 9 pages, Apr. 25, 2015.

Bartolini, Novella et al., "A Walk through Content Delivery Networks," International Workshop on Modeling, Analysis, and Simulation of Computer and Telecommunication Systems, 25 pages, (2003).

Carlier, Axel et al., "Towards Characterizing Users' Interaction with Zoomable Video," Social, Adaptive and Personalized Multimedia Interaction and Access, ACM, New York, NY, 4 pages (2010).

D'Aguanno, "Lan Protocol Attacks, Part 1, ARP Reloaded," Presented at Defcon 15, Las Vegas, Nevada, 35 pages, Aug. 2007.

Fraunhofer, Fokus, "360 Video Experience on TV Device," www.fokus.fraunhofer.de/go/360, Apr. 7, 2016, 22 pages (2016).

Jennehag, et al., "Gradual Tune-in Pictures for Fast Channel Change," The 8th Annual IEEE Consumer Communications and Networking Conference-Special Session IPTV and Multimedia CDN, pp. 766-770, 2011.

Kuzyakov, et al., "Next-Generation Video Encoding Techniques for 360 Video and VR," retrieved from URL: https://code.fb.com/virtual-reality/next-generation-video-encoding-techniques-for-360-video-and-vr/, 5 pages (Jan. 21, 2016).

(56) References Cited

OTHER PUBLICATIONS

Open Networking Foundation, "Software-Defined Networking: The New Norm for Networks," ONF White Paper, 12 pages, Apr. 13, 2012.

Ramos, et al., "Reducing channel change delay in IPTV by predictive pre-joining of TV channels," Signal Processing: Image Communication, vol. 26, pp. 400-412, 2011.

* cited by examiner

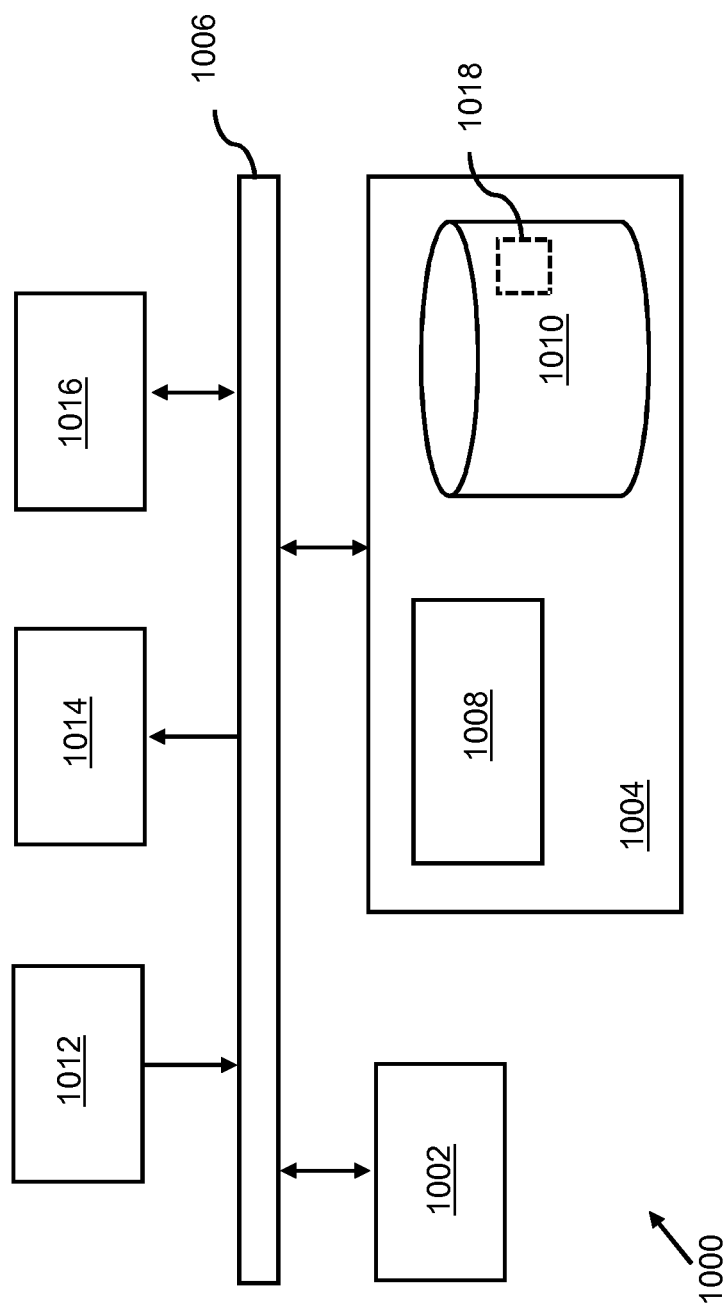

STREAMING VIRTUAL REALITY VIDEO

This application is the U.S. National Stage of International Application No. PCT/EP2017/078130, filed on Nov. 3, 2017, which designates the U.S., published in English, and claims priority under 35 U.S.C. § 119 or 365(c) to European Application No. 16197381.3, filed on Nov. 4, 2016. The entire teachings of the above applications are incorporated herein by reference.

FIELD OF THE INVENTION

The invention relates to a method for use in a streaming process of a Virtual Reality [VR] video to a VR rendering device. The invention further relates to a computer program comprising instructions for causing a processor system to perform the method, and to the VR rendering device.

BACKGROUND ART

Virtual Reality (VR) involves the use of computer technology to simulate a users physical presence in a virtual environment. Typically, VR rendering devices make use of Head Mounted Displays (HMD) to render the virtual environment to the user, although other types of VR displays and rendering techniques may be used as well, including but not limited to holography and Cave automatic virtual environments.

It is known to render VR video using such VR rendering devices, e.g., a video that is suitable for being played-out by a VR rendering device. The VR video may provide a panoramic view of a scene, with the term 'panoramic view' referring to, e.g., an at least 180 degree view. The VR video may even provide larger view, e.g., 360 degrees, thereby providing a more immersive experience to the user.

A VR video may be provided to a VR rendering device in a streaming process. In such a streaming process, image data of the VR video is transferred from a source to, ultimately the display of the VR device. For example, a VR video may be streamed to a VR rendering device as a single video stream. However, if the entire panoramic view is to be streamed in high quality and possibly in 3D, this may require a large amount of bandwidth, even when using modern video encoding techniques. Such bandwidth requirements may easily reach tens or hundreds of Mbps. As VR rendering devices frequently stream the video stream via a bandwidth constrained access network, e.g., a Digital Subscriber Line (DSL) or Wireless LAN (WLAN) connection or Mobile connection (e.g. UMTS or LTE), the streaming of a single video stream may place a large burden on the access network or such streaming may even not be feasible at all. For example, the play-out may be frequently interrupted due to re-buffering, instantly ending any immersion for the user. Moreover, the receiving, decoding and processing of such a large video stream may result in high computational load and/or high power consumption, which are both disadvantageous for many devices, esp. mobile devices.

It has been recognized that a large portion of the VR video may not be visible to the user at any given moment in time. A reason for this is that the Field Of View (FOV) of the display of the VR rendering device is typically significantly smaller than that of the VR video. For example, a HMD may provide a 100 degree FOV which is significantly smaller than, e.g., the 360 degrees provided by a VR video.

As such, it has been proposed to stream only parts of the VR video that are currently visible to a user of the VR rendering device. For example, the VR video may be spatially segmented into a plurality of (usually) non-overlapping video streams which each provide a different view of the scene. When the user changes viewing angle, e.g., by rotating his/her head, the VR rendering device may determine that another video stream is needed (henceforth also simply referred to as 'new' video stream) and switch to the new video stream by requesting the new video stream from a VR source.

Due to adapting and executing the streaming process unavoidably delays occur between a head movement and adapting the displayed image data to the new head orientation, i.e. ultimately the right photons arriving at the eye. Disadvantageously, the delay between the user physically changing viewing angle, and the new view actually being rendered by the VR rendering device, may be too large. Such delay may be called 'motion-to-photon latency' in general or 'switching latency' when different video streams are involved, and may be sizable due to an aggregate of delays. The delay between requesting a new video stream and the new video stream actually arriving at the VR rendering device is typically a large contribution. The rendering device may have to wait for a decodable frame due to the random access time in the new stream, for example an I-frame in a Group of Pictures, before decoding can start. Other, delays include buffering delays, synchronization delays, delays due to the decoding of the video streams, delays in the measurement of head rotation, etc.

Various attempts have been made to address the latency problem. For example, it is known to segment the plurality of video streams into at least partially overlapping views, or by using video tiles to send more image regions than the current viewport, thereby providing so-termed 'guard bands' which contain video content just outside the current view. Viewport is the part of the VR data that is actually looked at by the viewer. The size of the guard bands is typically dependent on the speed of head rotation and the latency of switching video streams. Disadvantageously, given a particular bandwidth availability, the use of guard bands reduces the video quality given a certain amount of available bandwidth, as less bandwidth is available for the video content actually visible to the user. It is also known to predict which video stream will be needed, e.g., by predicting the user's head rotation based on inertia and a current rotation speed, and request and stream the new video stream in advance. However, as in the case of guard bands, bandwidth is then also allocated for streaming non-visible video content, thereby reducing the bandwidth available for streaming currently visible video content. Also, it is not possible to anticipate on movement starting using such predictions, only to extrapolate existing movement.

US20150346832A1 describes a playback device which generates a 3D representation of the environment which is displayed to a user of the customer premise device, e.g., via a head mounted display. The playback device is said to determine which portion of the environment corresponds to the users main field of view. The device then selects that portion to be received at a high rate, e.g., full resolution with the stream being designated, from a priority perspective, as a primary stream. Content from one or more other streams providing content corresponding to other portions of the environment may be received as well, but normally at a lower data rate.

A disadvantage of the playback device of US20150346832A1 is that it may insufficiently reduce switching latency. Another disadvantage is that the playback device may reduce the bandwidth available for streaming visible video content.

SUMMARY OF THE INVENTION

It would be advantageous to obtain a streaming of VR video which addresses at least one of the abovementioned problems of US20150346832A1.

The following aspects of the inventions involve a VR rendering device rendering, or seeking to render, a view of the scene on the basis of one or more streams which are needed to render the view. In the streaming process the VR video is represented by one or more streams in a so-called configurable setup. Each respective configured setup provides respective different image data of a scene. The configured setup at least defines the respective stream or streams, and may also define other settings, parameters or structures of a delivery chain that provides the VR video to the VR rendering device. The VR rendering device is configured to detect a current head position and to render a selected view of the scene corresponding to the current head position on the basis of the one or more streams.

In accordance with a first aspect of the invention, a method may be provided for use in the streaming process of a VR video to a VR rendering device. The streaming process has a configurable setup. In each configured setup the VR video may be represented by one or more streams. Each configured setup may provide respective different image data of a scene. The VR rendering device is arranged to render, on the basis of the one or more streams, a current view of the scene based on a current head position. The method may comprise:

executing the streaming process according to a first configured setup providing first image data needed to render the current view;

determining EEG data by measuring brain signals;

predicting a head movement based on the EEG data;

determining target image data differing from the first image data and needed for rendering a future view based on the predicted head movement;

determining a second configured setup for providing the target image data; and executing the streaming process according to the second configured setup.

In accordance with a further aspect of the invention, transitory or non-transitory computer-readable medium may be provided comprising a computer program. The computer program may comprise instructions for causing a processor system to perform the method.

In accordance with a further aspect of the invention a VR rendering device may be provided for rendering a VR video using a streaming process having a configurable setup. In each configured setup the VR video may be represented by one or more streams. Each configured setup may provide respective different image data of a scene. The VR rendering device may comprise:

a receiver to receive the one or more streams according to a current configured setup; and a display processor configured to render a current view of the scene based on a current head position on the basis of the one or more streams; and a controller configured to:

execute the streaming process according to a first configured setup providing first image data needed to render the current view;

determine EEG data by measuring brain signals;

predict a head movement based on the EEG data;

determine target image data differing from the first image data and needed for rendering a future view based on the predicted head movement;

determine a second configured setup for providing the target image data; and execute the streaming process according to the second configured setup.

In an embodiment, the VR rendering device comprises a brain signal detector. The brain signal detector may be a separate device, e.g. having a wireless interface to the VR rendering device, or may be a separate unit attachable to the head mounted display, or may be integrated with the head mounted display.

In accordance with a further aspect of the invention a VR data structure may be provided for transferring VR data between the above VR rendering device and a VR server, the VR data structure comprising prediction data indicating at least one of the predicted head movement;
a predicted head movement direction;
a predicted head movement speed;
a predicted head movement acceleration;
a predicted head movement angle;
a predicted head movement onset;
a predicted head movement ending;
the target image data;
the second configured setup;
the future view;

which prediction data is based on a predicted head movement based on the EEG data.

The VR data structure may further comprise timing information indicating the predicted timing of the movement and/or the future time when the target image data, second configured setup or future view is required or predicted to be required. In case the VR data structure comprises an indication of one or more streams, e.g. related to tiled streams predicted for the second configured setup, the timing information may differ per stream. The timing information enables the VR server to execute the streaming process just in time, in particular so that the future view may be rendered just in time on the VR rendering device for a predicted movement.

In accordance with a further aspect of the invention a VR server may be provided for providing or forwarding VR video to the above VR rendering device, wherein the VR server is arranged to process the VR video to provide the one or more streams;

to receive, from the VR rendering device, the above prediction data structure; and to adapt said processing of the VR video according to the prediction data.

The streaming process may involve streaming of the VR video across a network and/or retrieving the VR video from a data source, and processing the VR video in various processing stages along a delivery chain of units that are involved in delivering the video at a display in the VR rendering device. The streaming process may have a configurable setup which defines said streaming and/or processing. During executing the streaming process may be configured and controlled according to the configured setup.

In the configured setup, the VR video may be represented by one or a plurality of streams. Each stream, for a given video frame, may comprise different image data of a scene. The VR rendering device is arranged to render a current view on the basis of the one or more streams. The plurality of streams may be, but do not need to be, independently decodable streams or sub-streams. The plurality of streams may be available from one or more stream sources in a network, such as one or more media servers accessible via the internet.

The current view of the scene is based on a current head position. The current head position may be estimated based on sensors in the VR rendering device when worn on the head (typically called inside-out tracking), or by other detectors such as a camera system registering the position of the head (typically called outside-in tracking). As such, estimating a current head position and determining and displaying a current view corresponding to the estimated head position is well known in the field of VR. The VR rendering device may render different views of the scene over time, e.g., in accordance with a current viewing angle of the user, as the user may rotate and/or move his or her head during the viewing of the VR video. Here, the term 'view' may refer to the rendering of a spatial part of the VR video which is to be displayed to the user, with this view being also known as 'viewport'. It will be appreciated that the functionality described in this paragraph may be known per se from the fields of VR and VR rendering.

During the use of the VR rendering device, one or more different streams may thus be needed to render different views over time. During this use, the VR rendering device may identify which one(s) of the plurality of streams are needed to render a selected view of the scene, the configured setup identifying a subset of streams, which may then be requested from the one or more stream sources. Here, the term 'subset' is to be understood as referring to 'one or more'.

Executing the streaming process may involve various sub-processes, such as encoding, decoding, transferring data streams via a network and further processing of the image data. The sequence of sub-processes executed in multiple, connected devices may be called together a video delivery chain. In general, the setup of the streaming process, e.g. structure of the image data, parameters of the streaming sub-processes, etc., is configurable to provide the required image data at the right time to the display. In such a configurable setup of the streaming process the VR video may be represented by one or more streams. Each configured setup provides respective different image data of a scene. For example, the streaming process may comprise retrieving data from local 360 degree files. Current mobile devices are unable to process very high resolution video files, e.g. a 4K resolution or higher. By limiting the target data based on head prediction, the mobile device may only decode and process the current viewport, saving processing, battery power and in general prevents the device from overheating.

Determining EEG data by measuring brain signals means, in the context of the invention, any way of measuring brain signals or brain activity and subsequently processing the measurements for deriving relevant data from such measurements. The relevant data is called EEG data and represents relevant features of the brain signals. A traditional EEG measurement using electrodes on the scalp is relatively easily executable by one or more wearable electrodes. Such EEG data has a high temporal resolution. Another measurement technique is functional Near-infrared spectroscopy (fNIRS), which is a spectroscopic method that uses the near-infrared region of the electromagnetic spectrum (from about 700 nm to 2500 nm). fNIRS may be performed via the skin and is also wearable. fNIRS roughly detects oxygen fluctuations in the brain which indicates local brain activity. This may also contain information about spatial attention/upcoming movement. So, while we speak of EEG data we include any other way of measuring or deriving brain activity such as fNIRS.

The term 'current view' refers to an actual view which is to be rendered for an actual orientation of the head. The view may change, e.g., in response to a change in viewing angle of the user as a result of a certain head movement. The invention concerns predicting such a head movement based on EEG data. Based on the predicted head movement, target image data is determined, which differs from the current image data and is needed for rendering a future view based on the predicted head movement. The target image data at least comprises a target area where the future view is expected.

The prediction data represents the predicted head movement and/or further prediction data derived from the EEG data. The predicted head movement may include timing data of the prediction, while explicit timing data like the movement onset or movement ending may be included in the prediction data also. The timing data may indicate the time the prediction was made, one or more instants for which one or more predicted head movements are defined, the time the predicted movement is expected to occur, etc. The prediction data may be used for adjusting various parts of the streaming process.

The measures in accordance with the invention as defined above have the following effect. Based on predicting the head movement using EEG data, a new configured setup is determined. Subsequently, the streaming process is adapted well before the actual head movement takes place by executing the streaming process according to the second configured setup. These steps may be repeated regularly. Thereby, the streaming process is enabled to deliver, before the actual head movement and assuming the prediction was correct, the target image data as required for the view that is to be displayed at a later time when actual head movement takes place. Typically, predicting head movement using EEG data, may compensate delays up to a few hundred milliseconds. Advantageously, the so-called motion-to-photon latency is reduced and/or the amount of data that is to be streamed is reduced and/or the quality of the views actually perceived via the VR rendering device is increased.

The invention is based, inter alia, on the following recognitions. The inventors intended to spend streaming bandwidth or streaming processing, where contribution to the quality of the perceived VR is highest. The streaming processing inherently involves delays in delivering the VR image data, requires VR video processing which may relate to power consumption, e.g. from a battery in a mobile rendering device. In general, the perceived quality is affected by motion-to-photon delay, delays to receive required new content, quality of the image, gaps in the image when moving the head, and getting the highest quality image possible by spending image data bits on the parts that are being viewed. The inventors have found that the streaming process can be adapted early, i.e. well before a head movement actually occurs, by using EEG data to predict head movement at an early stage, for example predicting movement onset and movement direction. Based on the EEG lead time a suitably long time, e.g. a few hundred milliseconds, is available to adapt the streaming process. Subsequently they have proposed to determine, at said early stage, a second configured setup taking into account the predicted head movement. By executing the second configured setup they have provided the streaming process with an early warning for an upcoming head movement, which amply precedes any muscle movement. The adapted configured setup may achieve lower motion-to-photon delay compared to other view-based streaming approaches or may even compensate motion-to-photon delay completely. Also, bandwidth use may be optimized by spending the available bits or processing power mostly on content actually being viewed. The adapted configured setup may involve spending more bandwidth or processing on relevant parts. Parts are relevant when they are or will be viewed, or have a high chance of being viewed based on a combination of spatial and temporal prediction. Also, less bandwidth may be spent on less relevant parts. Parts are less relevant when they are not viewed or will not be viewed, of have a low change of being viewed.

In an embodiment, predicting a head movement comprises predicting a movement direction based on the EEG data, and determining the target image data is based on the predicted movement direction. The movement direction is derived from the EEG data indicative of a particular movement direction, e.g. a yaw to the left. The target image data is effectively biased in the predicted movement direction to enable rendering the future view displaced in the movement direction with respect to the current view.

In an embodiment, the predicting a head movement further comprises at least one of:

predicting a head movement due to a change of a focus of attention position based on the EEG data;

predicting a yaw movement rotating the head around a vertical axis based on the EEG data;

predicting a roll movement rotating the head around a view axis in a view direction based on the EEG data;

predicting a pitch movement rotating the head around a lateral axis perpendicular to the view direction based on the EEG data;

predicting a head translation based on the EEG data;

predicting a head movement speed based on the EEG data;

predicting a head movement acceleration based on the EEG data;

predicting a head movement angle based on the EEG data. The various specific head movements or combinations thereof as defined above enable a more specific prediction of the future head orientation, and henceforth enable determining the target image data and the target are for the corresponding future view.

In an embodiment, predicting a head movement comprises predicting a movement onset based on the EEG data, and determining the second configured setup in dependence of the predicted movement onset; or predicting a movement ending based on the EEG data and determining the second configured setup in dependence of the predicted movement ending. Various timing data of head movements like the movement onset or ending or a combination thereof enable a prediction of time when a future head movement may occur. Henceforth predicting the timing enables determining timing when the target image data is required for rendering the corresponding future view. Thereby the second configured setup may take into account the delays known to occur in the streaming process and anticipate such delays based on the predicted timing of the head movement.

In an embodiment, the target image data comprises a target area where the future view is expected and a guard area, and wherein determining the target image data comprises determining the guard area which is spatially adjacent to the target area. Advantageously the target area may be the area most likely to be viewed and may be processed to have a higher image quality than the guard area, whereas the guard area is available at the moment of actually displaying a future view that deviates somewhat from the predicted future view, e.g. to accommodate for inaccuracies in the prediction. The guard area then avoids displaying black areas where some part of the actual view deviates from the predicted further view.

Determining the guard area may further comprise at least one of the following options:

determining the guard area for accommodating a difference between the predicted head movement and an actual future head movement;

determining the guard area in dependence of an estimated accuracy of the predicted head movement;

adjusting the size of the guard area in dependence of the estimated accuracy of the predicted head movement, and reducing the size at increasing accuracies;

adjusting the quality of the guard area in dependence of the estimated accuracy of the predicted head movement, and increasing the quality at increasing accuracies;

determining the guard area spatially adjacent in all directions around the image data of the first configured setup based on a predicted movement onset while the movement direction is not yet predicted;

determining the guard area spatially adjacent in a subset of directions to the image data of the first configured setup corresponding to a predicted movement direction;

determining the guard area spatially adjacent in a left or right movement direction to the image data of the first configured setup when a horizontal head rotation and a corresponding movement direction are predicted;

determining the guard area spatially adjacent in a direction above or below of the image data of the first configured setup when a vertical head rotation and a corresponding movement direction are predicted. Establishing the guard area according to one or more of the above options enables to adjust the amount of bandwidth used for the guard area and/or the directions in which less or no guard area is needed. Hence transfer capacity and processing power may be effectively used to optimize the perceived image quality. For example, when determining the guard area spatially adjacent in a subset of directions, and the predicted head movement is yaw to the left, then the guard area at the right side may be completely skipped, while still maintaining some guard area above and below the image data of the current view.

Determining the second configured setup may further comprise at least one of the following options:

having the second configured setup provide the image data for the guard area at a lower quality than the quality of the image data for the area corresponding to the current view;

having the second configured setup provide the image data for at least part of the target area at a lower quality than the image data of the current view according to the first configured setup when a head movement is predicted;

having the second configured setup provide at least part of the target area at a higher quality than the image data of the current view according to the first configured setup when a deceleration of head movement is predicted for the second configured setup. For example, when having the second configured setup provide the image data for the guard area at a lower quality than the quality of the image data for the area corresponding to the current view, the guard area has a lower quality than the quality of the current view. When the image data for the first configured setup does not have a guard area, the quality of the future view based on the prediction may also be somewhat lower than the quality of the current view so as to limit the total required amount of image data to be transferred. Also, the quality of the future view may be set to be higher than the quality of the guard area.

Executing the second configured setup according to one or more of the above options enables to effectively use transfer capacity and processing power to optimize the perceived image quality.

In an embodiment, the determining a second configured setup further comprises determining prediction data indicating at least one of
the predicted head movement;
a predicted head movement direction;
a predicted head movement speed;
a predicted head movement acceleration;
a predicted head movement angle;
a predicted head movement onset;
a predicted head movement ending;
the target image data;
the future view.

Optionally, the streaming process comprises obtaining the VR video from or via a VR server and processing the VR video at the VR server to provide the one or more streams. In this and other embodiments, the VR server may be a forwarding node in a network that receives the VR video from a VR source or another VR server. Executing the second configured setup may comprise transferring the prediction data to the VR server for enabling the VR server to adapt processing of the VR video to provide the one or more streams according to the prediction data. Advantageously the VR server may adjust or optimize the streams according to the prediction data. Note that in this and other embodiments, the VR server may be a forwarding node in a network that receives the VR video from a VR source or another VR server.

Optionally the streaming process comprises obtaining the VR video from a camera oriented towards the scene at a VR source. Determining a second configured setup may further comprise determining at least one command based on the prediction data. Executing the second configured setup may further comprise transferring the command to the VR source to enable controlling the camera. Advantageously, at the VR source, the camera may be controlled according to the commands to provide the required image data.

In an embodiment, the streaming process comprises obtaining the VR video from multiple locations, respective image data from the respective locations together constituting the scene and each location providing at least one respective stream. Optionally, determining the second configured setup may further comprise including in the second configured setup a respective stream when the target image data comprises at least part of the respective image data. Optionally, determining of a further configured setup comprises excluding from the further configured setup a respective stream when the target image data no longer comprises the respective image data. Advantageously, adjusting the configured setup by controlling the respective streams that are necessary and sufficient to render the further view avoids transferring and/or processing of image data that is not used for displaying views.

In an embodiment, the streaming process comprises, in a video delivery chain, at least one of the sub-processes:
capturing image data,
stitching together image data from multiple sources,
encoding image data,
encoding different versions of the same content for different viewports, while in a respective version encoding image data for the respective viewport in high quality and encoding image data for other parts in lower quality,
packetizing image data into a stream,
transporting a stream via a network,
de-packetizing image data from a stream,
buffering image data, decoding image data,
displaying image data.

The various sub-processes may be executed at different locations and/or in different devices, which together constitute the delivery chain. Optionally, the streaming process in the VR rendering device may comprise processing at least one of the sub-processes:
retrieving the one or more streams from a local file in or near the VR rendering device,
stitching together image data from multiple streams,
de-packetizing image data from a stream,
buffering image data, decoding image data,
displaying image data.

Executing the second configured setup may further comprise controlling at least one of the sub-processes based on the predicted head movement. Advantageously the respective controlled sub-process may require less processing power, use less power, and/or may execute faster and so reduce delays.

In an embodiment, predicting a head movement further comprises using a classification model to distinguish predictions of different head movements based on the brain signals. The method may further comprise at least one of the following.

Optionally, the method comprises training the classification model using the EEG data in sample periods of a predetermined length preceding a predetermined head movement. Effectively processing the EEG data in such sample periods allows a structured cycle of predicting and updating the configured setup. Also, training the classification model on correspondingly sampled EEG data provides the corresponding predicted head movement.

Optionally, the method comprises training the classification model based on head movement data derived from successive actual head orientations and corresponding predicted head movements. Advantageously, the successive actual head orientations are available during real-time use, e.g. a user wearing a head mounted VR rendering device. So training data for the actual user is available and is used to further improve the classification model.

Optionally, the method comprises providing from the model multiple graded outputs for multiple possible head movements and using the multiple graded outputs for determining the target image data. Advantageously, the target image data may now be based on graded probabilities of various head movements. Due to using graded probabilities a higher overall probability is achieved that the actual view to be displayed at the time of the predicted future view actually corresponds to the predicted future view.

In an embodiment, determining the second configured setup comprises obtaining spatial relation data which is indicative of a spatial relation between respective different image data of the scene as provided by respective streams and identifying, by using the spatial relation data, the one or more streams which are needed to provide the target image data. For example, the spatial relation data may be obtained from a VR server that transfers the one or more streams via a network, where the streams represent different tiles of the VR video. Advantageously, the spatial relation data enables identifying which streams are needed to provide the target image data, e.g. by selecting the respective tiles at the required quality.

It will be appreciated that the scene represented by the VR video may be an actual scene, which may be recorded in real-time or pre-recorded at an earlier time by one or more cameras. However, the scene may also be a rendered scene, e.g., obtained from computer graphics rendering of a model, or comprise a combination of both recorded parts and rendered parts.

It will be appreciated by those skilled in the art that two or more of the abovementioned embodiments, implementations, and/or aspects of the invention may be combined in any way deemed useful.

Modifications and variations of the VR rendering device, the VR server, the sources of the one or more streams and/or the computer program, which correspond to the described modifications and variations of the method, and vice versa, can be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings,
FIG. 27 shows an exemplary data processing system.

It should be noted that items which have the same reference numbers in different figures, have the same structural features and the same functions, or are the same signals. Where the function and/or structure of such an item has been explained, there is no necessity for repeated explanation thereof in the detailed description.

DETAILED DESCRIPTION OF EMBODIMENTS

The following describes several embodiments of streaming a VR video to a VR rendering device. The VR video may be represented by one or more streams each providing different image data of a scene. The embodiments involve the VR rendering device rendering, or seeking to render, a selected view of a scene on the basis of a subset of the streams.

In the following, the VR rendering device may simply be referred to as 'receiver' or 'client' or 'sink' or 'terminal', a VR source may simply be referred to as 'server' or 'source'.

The image data representing the VR video may be 2D image data, in that the canvas of the VR video may be represented by a 2D region of pixels, with each stream representing a different sub-region or different representation of the 2D region. However, this is not a limitation, in that for example the image data may also represent a 3D volume of voxels, with each stream representing a different sub-volume or different representation of the 3D volume. Another example is that the image data may be stereoscopic image data, e.g., by being comprised of two or more 2D regions of pixels or by a 2D region of pixels which is accompanied by a depth or disparity map.

A streaming process is used to provide a Virtual Reality [VR] video to a VR rendering device. The streaming process has a configurable setup. In a configured setup the VR video is represented by one or more streams. Each configured setup provides respective different image data of a scene. The VR rendering device is arranged to render, on the basis of the one or more streams, a current view of the scene based on a current head position.

Figure 1:
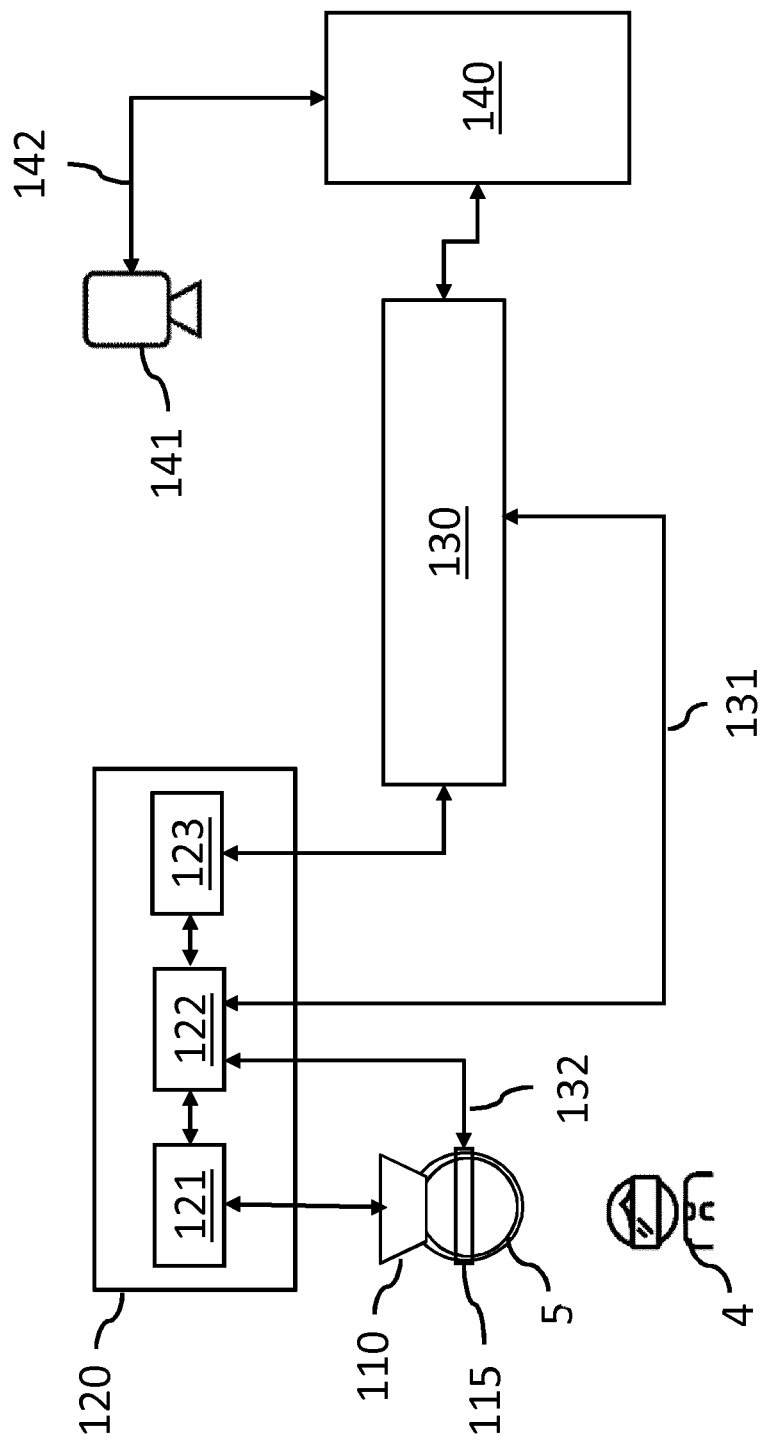
FIG. 1 shows a system for rendering a VR video.

FIG. 1 shows a system for rendering a VR video. The Figure schematically shows a user 4 wearing a head mounted display 110 mounted on his head 5. The user also wears a brain signal detector 115 for detecting brain signals, for example one or more electrodes positioned on the scalp for measuring EEG voltages.

The brain signal detector 115 may be a separate device, separate or attachable to the head mounted display 110, or integrated with the head mounted display 110. The position of the brain signal detector 115 may be adjustable compared to the position of the head mounted display 110.

In the Figure a video delivery chain 130 schematically indicates a connection between a VR source 140 and a VR rendering device 120. The VR rendering device may be a separate processor or computer, or may be at least partly be integrated in a housing of the head mounted display. The VR rendering device has a receiver 122 to receive the one or more streams according to a current configured setup via the video delivery chain. In this document, where mentioning VR video, the data may also include, or exclusively consist of, still images, while the video or still images may be in 2D or in 3D.

The VR rendering device 120 has a display processor 121 configured to render, on the basis of the one or more streams, a current view of the scene based on a current head position. The head position may be detected by sensors in the head mounted display, or by another detection system like a camera capturing the head of the viewer from a distance and determining the head orientation. The display processor may be connected to the head mounted display, or to a different type of VR display system, for example display screens in the head mounted display, or to a different display system like beamers and projection screens placed around a viewer.

The VR rendering device 120 has a controller 123 coupled to the display processor 121 and the receiver 122. The controller is configured to execute the streaming process according to a configured setup of the streaming process, which control is schematically indicated by arrow 131. The controller may also control the receiver and/or display processor according to the configured setup, as the streaming process may also be implemented, e.g. in part, in the receiver 123 and/or the display processor. By executing the streaming process, the controller provides the image data needed to render the current view. The actual configured setup, which applied to provide the image data for the current view may be called the current configured setup or first configured setup.

The controller is further configured to determine EEG data by measuring brain signals, as further elucidated with reference to FIGS. 2-6. Thereto the controller may be coupled to brain signal detector 115 as indicated by an arrow 132. Brain signals may also be acquired via a different measurement system, e.g. by measuring other physiological parameters or signals that reflect brain activity. The brain signals are selectively measured and processed to detect brain activity that correlates with initiating a head movement. It has been found that, typically, certain parts of the brain are involved in controlling the muscles to rotate the head in a specific direction or moving the focus of attention. In addition, shifts in spatial attention typically precede head movements and can be detected from brain signals at certain frontal and occipital locations. The controller is arranged to measure brain signals on locations that correspond to said parts and determine the corresponding EEG data.

The controller may be further configured to associate brain signals to subsequent head movements using a classification methodology. A model may be trained and used by the controller to predict head movement based on EEG data. Also, for the prediction of head movement, predefined relations between certain brain signals and predicted movements may be stored in a memory. Predicting a head movement may involve predicting a movement direction based on the EEG data. Correspondingly, the target image data may be determined based on the predicted movement direction. Also, predicting a head movement may comprise predicting a movement onset based on the EEG data, and determining the second configured setup in dependence of the predicted movement onset. Also, predicting a head movement may comprise predicting a movement ending based on the EEG data, while determining the second configured setup in dependence of the predicted movement ending.

For said predicting the head movement, a classification model may be embedded in the controller. The model may have multiple inputs for the respective brain signals and an output delivering the predicted head movement, e.g. a movement onset time prediction and/or a movement direction and a movement speed. Such a model may be based on a training sequence of measured EEG data as exemplified below with FIGS. 4, 5 and 6.

Figure 2:
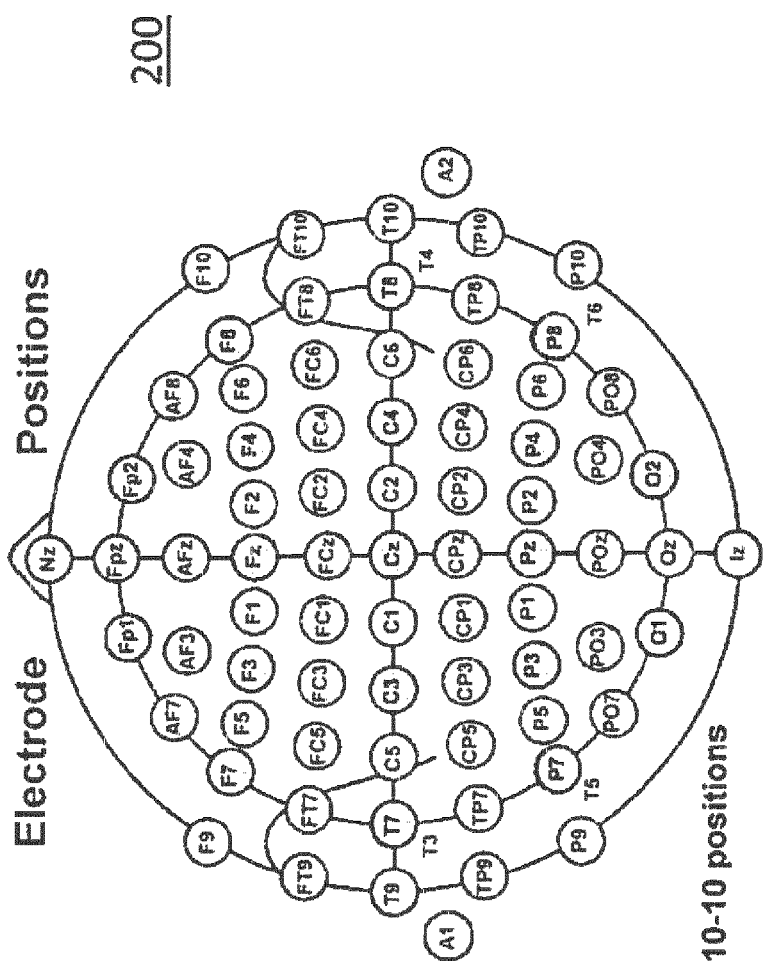
FIG. 2 illustrates electrode positions for measuring EEG voltages.

FIG. 2 illustrates electrode positions for measuring EEG. The Figure schematically indicates positions of electrodes on the scalp by corresponding acronyms. As such, the system of positions and naming the positions is well established in the field of neurophysiology. Further details can be found in the document 'Jasper, Herbert H. (May 1958). "Report of the committee on methods of clinical examination in electroencephalography: 1957" (PDF). Electroencephalography and Clinical Neurophysiology. 10 (2): 370-375'

Figure 3:
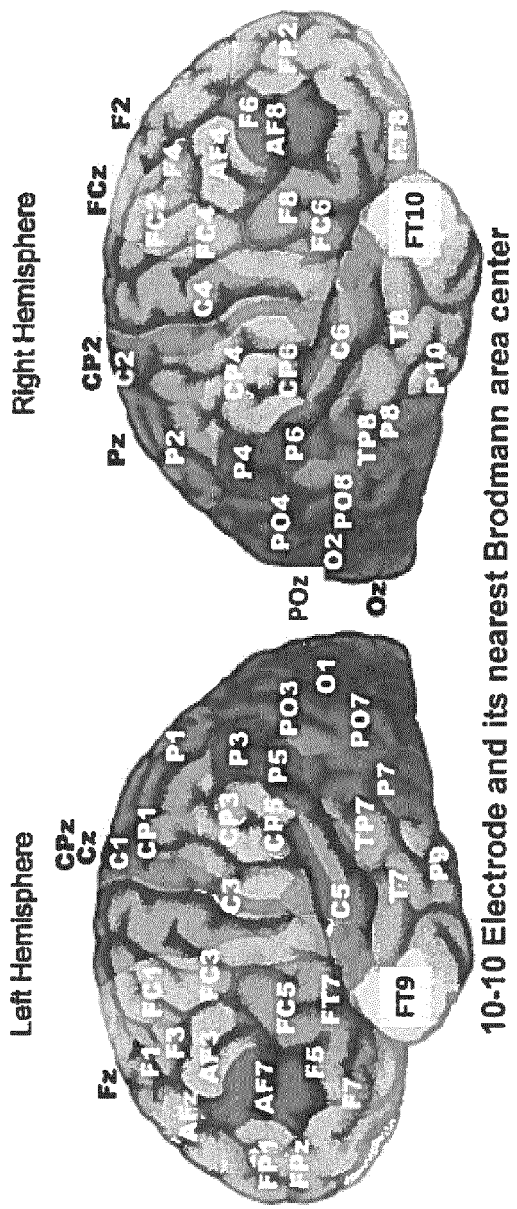
FIG. 3 illustrates locations of brain areas for detecting brain signals.

FIG. 3 illustrates locations of brain areas for detecting brain signals. As such, the brain areas and their corresponding function in the human body are well established in the field of neurophysiology, and are named Brodmann area centers. The Figure also indicates the corresponding electrode positions using the acronyms as elucidated above with FIG. 2. For the prediction of head movement various electrodes along the C/CP line (relating to the motor cortex) provide relevant EEG data. Such electrodes are located somewhat behind the ear-to-ear line across the top of the head. Such electrodes may conveniently be integrated with a wearable head mounted device, for example in a head band across said line. The inventors have also found relevant EEG data for respective movements in frontal electrodes (acronyms starting with F) which are located near the forehead.

Figure 4:
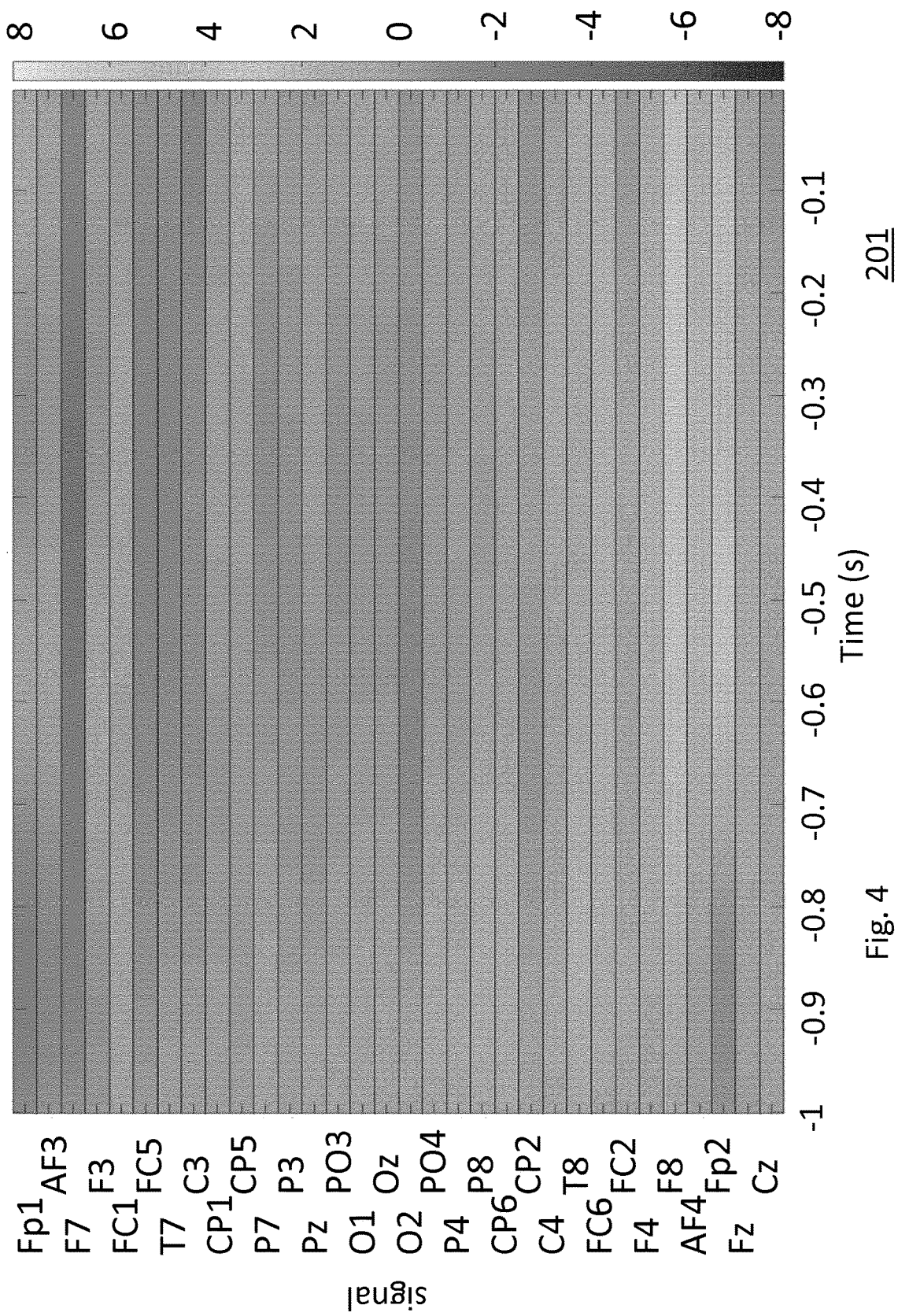
FIG. 4 shows an example of EEG data for no head movement.

FIG. 4 shows an example of EEG data for no head movement. The Figure shows a diagram having horizontal bands indicating by grey tones the intensity of a specific brain signals 201 for no movement as measured by electrodes at respective named locations on the scalp. The electrode names on the vertical axis follow the 10-20 system (Jasper, 1958) as shown in FIG. 2. The horizontal axis displays the time in seconds in negative values, i.e. the time before the actual movement which occurs at time is zero at the right side of the time axis.

Figure 5:
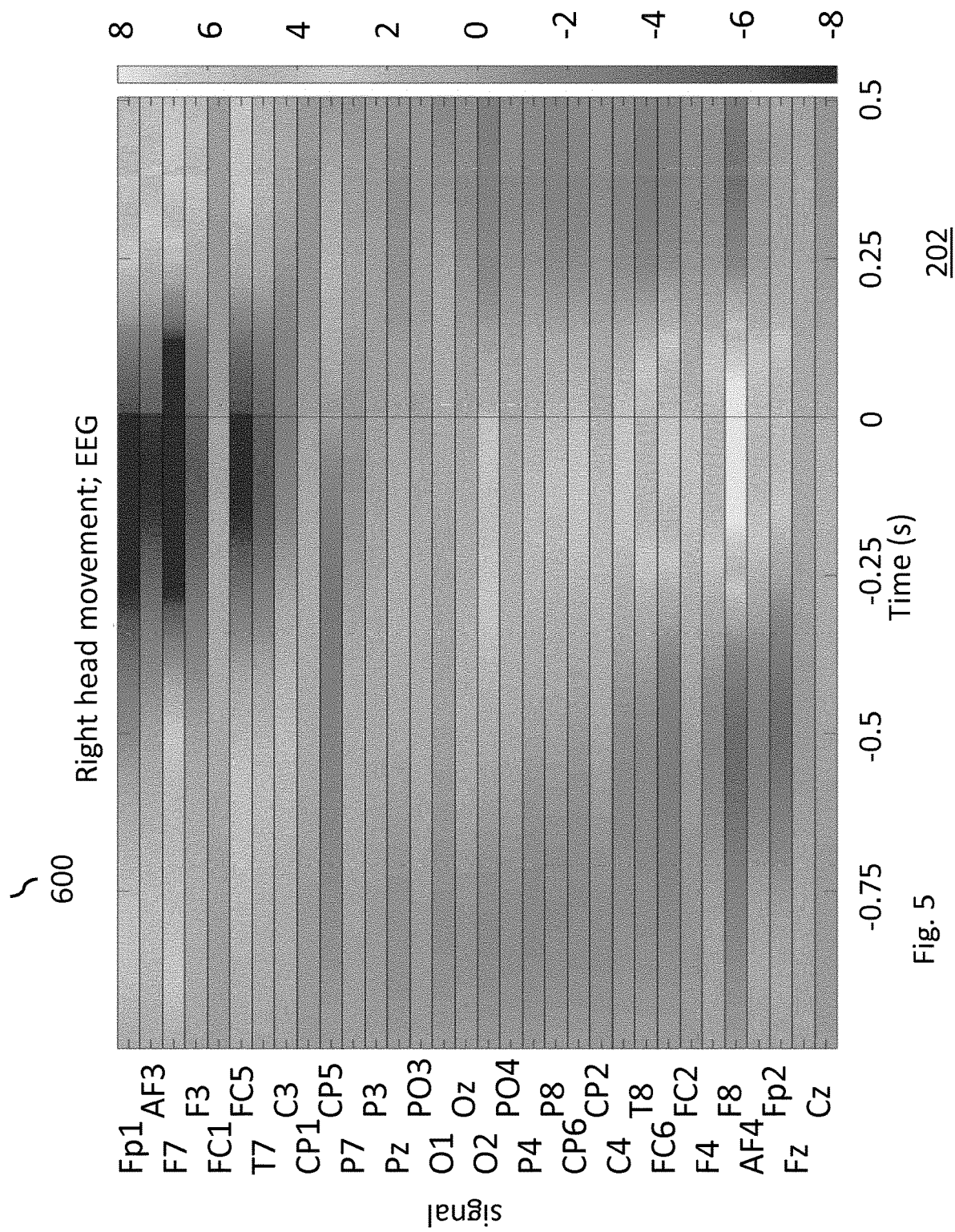
FIG. 5 shows an example of EEG data for an upcoming left head movement.

FIG. 5 shows an example of EEG data for an upcoming left head movement. The Figure is similar to FIG. 4 and shows brain signals 202 for a left movement as measured by electrodes at respective named locations on the scalp.

Figure 6:
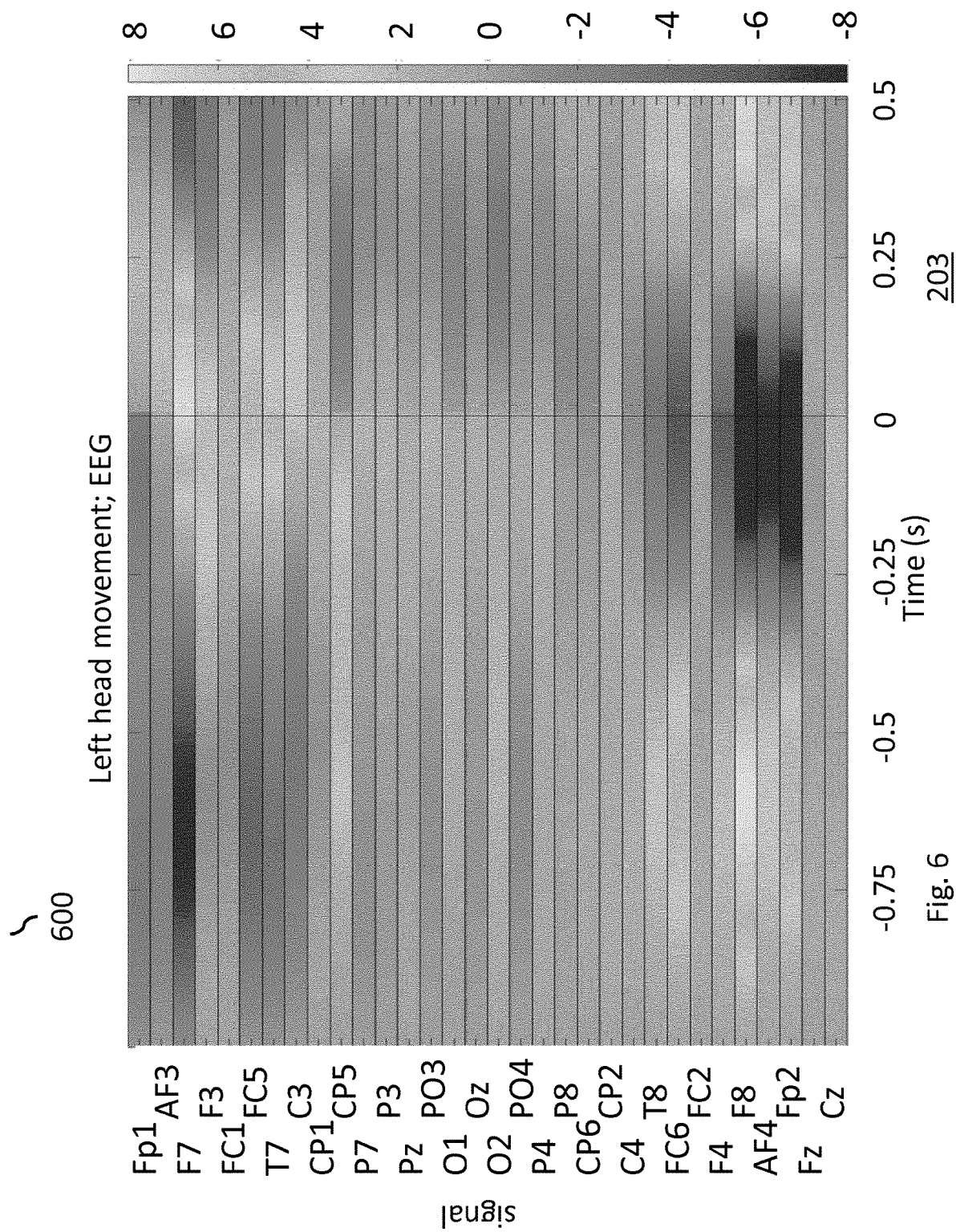
FIG. 6 shows an example of EEG data for an upcoming right head movement.

FIG. 6 shows an example of EEG data for an upcoming right head movement. The Figure is similar to FIG. 4 and shows brain signals 203 for a right movement as measured by electrodes at respective named locations on the scalp.

The process of predicting a head movement based on EEG data is based on the following considerations. EEG (Electroencephalography) measurements are usually performed by placing electrodes at certain places on the head to measure electrical activity in the brain. Before a body movement takes place, several processes have occurred in the brain. Depending on what elicited the movement, or what is its goal, attention has been drawn, a decision has been taken, and the movement has been planned by the brain. After planning, signals are sent to the muscles to contract, and only then the movement starts. Applying these insights enables use of brain signals to predict movement onset and/or direction at an early stage. The following section contains a more elaborate explanation of acquiring EEG data by measuring brain signals for detecting head movement onset and direction.

There are several ways to record brain activity such as fMRI, fNIRS, MEG, invasive and non-invasive EEG. For practical applications, a way of detecting is preferred that may be integrated in a HMD and has a high temporal resolution, such as non-invasive EEG (electroencephalography). EEG reflects electrical activity within the brain, mixed with noise from the environment, electrical activity originating from muscle activity etc. It is measured by electrodes that are attached to the scalp e.g. by means of a cap. Two general signals related to movement planning then can be captured by EEG. One is the readiness potential (cf. lateralized readiness potential, contingent negative variation or CNV, bereitschaftspotential: Walter et al., 1964; Kornhuber & Deecke, 1965; Coles, 1989; Leuthold et al., 2004; Guggisberg & Mottaz, 2013), and the other is (lateralized) event related desynchronization (Pfurtscheller, 2001). Known studies on these signals relate to hand or arm movements. Currently it was considered to derive information from EEG data about head movement.

The first type of signal has been observed at the motor cortex when signals are synchronized on movement onsets. Depending on the exact research paradigm, a slow negativity can start to occur already 2 s before movement onset. This effect has been attributed to non-specific (attention related) preparation for action. Around 400 ms before movement onset the signals become asymmetric according to whether the movement is left or right (the 'lateralized' part). For the desynchronization type of signal, we do not examine EEG waves as voltage over time as we do for the readiness potential, but we look at the power in the 10-12 Hz (alpha or mu) frequency band. A desynchronized signal, represented by a low power in the 10-12 Hz band, roughly corresponds to a high level of activation of that area. Left movement planning and execution corresponds to a relatively low power in the right hemisphere, and vice versa.

Figure 7A:
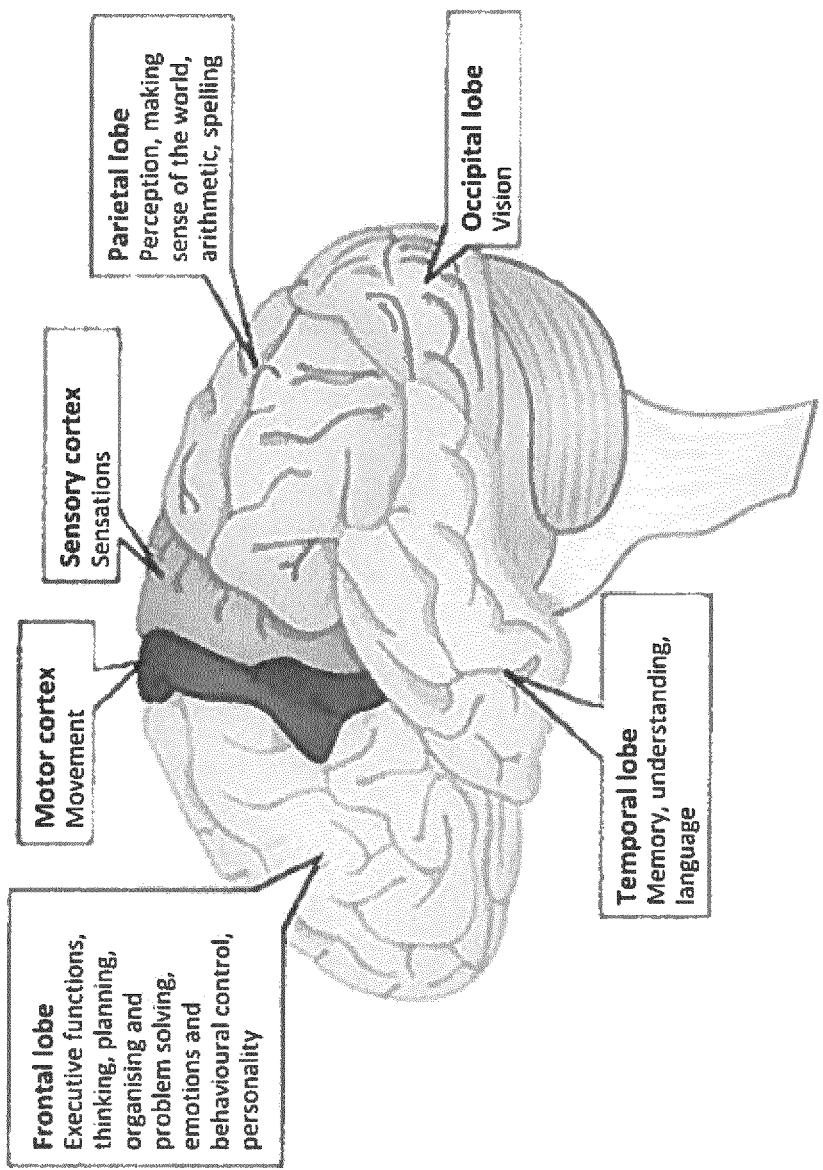
FIG. 7 shows locations in a human brain relating to movement control.
Figures 7B, 7C:
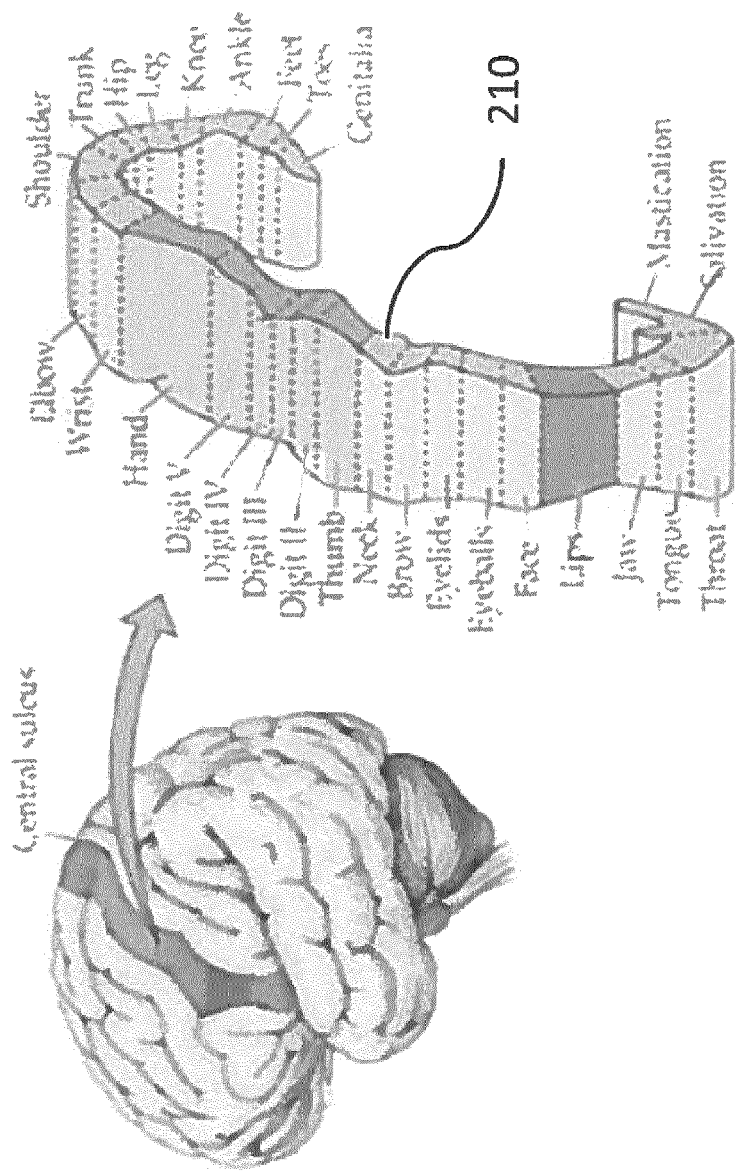

FIG. 7 shows locations in a human brain relating to movement control. FIG. 7a shows an overview of the human brain indicating the motor cortex that controls movement. FIG. 7b shows a lateral view of the brain showing the location of the primary motor cortex. FIG. 7c shows a representation of the human body in the primary motor cortex. The approximate location of the neck muscles at the motor cortex is indicated by reference numeral 210. The two hemispheres have been found to be active in 'mirror image' when left and right movement are contrasted given the global organization of the brain that the left part controls the right side of the body and vice versa. In addition to the locations mentioned above, other locations such as those related to visual attention (expected in the occipital cortex) or higher order attention and planning (decision making; expected in the frontal cortex) may be used.

The current application types require to extract information reliably from a single, (relatively) short interval of brain data. A classification model may be trained and validated for a person on the fly. A user may start wearing the HMD without the movement-prediction-related improved user experience. While wearing it, the system collects data on head movement as measured by the motion sensors and EEG, and starts to train (or improve) the model. When a certain accuracy is reached (as can be continuously verified without bothering the user), it can start to make use of this model. The system can continuously keep track of its own performance without requiring input of the user and if necessary, improve (recalibrate) itself, e.g. by weighing later collected data heavier than earlier collected data.

It is proposed to train classification models, such as Support Vector Machines, on samples of labelled data: intervals of EEG data that are known to belong to class A (e.g. 'preceded a left head movement) and intervals that are known to belong to class B (e.g. 'preceded a right head movement'). The models may now find how to best separate the classes A and B in multidimensional feature space, where features can be voltages at different times as recorded by different electrodes. The performance of the trained model can be evaluated by checking how well it can distinguish between the two ('left' and 'right') classes for new, unseen EEG data. It has been found that EEG may allow predicting movement onset up to 500 or 800 ms before it is detected using conventional measures and/or electrical signals from the muscles. Predicting voluntary head rotation represents a relatively hard case since rotating the head involves many muscles on both sides of the body, a relatively small amount of motor cortex is dedicated to the neck. Nevertheless, in the current system it has been found that head movement can be derived based on EEG data.

An extended classification model, or a similar training classification model, can be used for other classes, such as 'preceded an up head movement' or 'preceded a down head movement', defining velocity and/or acceleration classes etc.

A traditional method for streaming video to Virtual Reality headsets is to stream an entire 360-degree video to the receiver, possibly in 3D. Downside of this is reduced quality or large required processing capacity. The available bandwidth is normally limited in access networks, and has to be used for streaming the full 360 degrees, while a user only looks at a certain part of this at a certain point in time. To improve such streaming, various methods have been considered to effectively use the bandwidth only or mostly for what is being looked at by a VR user. Such methods may be called field-of-view (FoV) based streaming processes.

Figure 8:
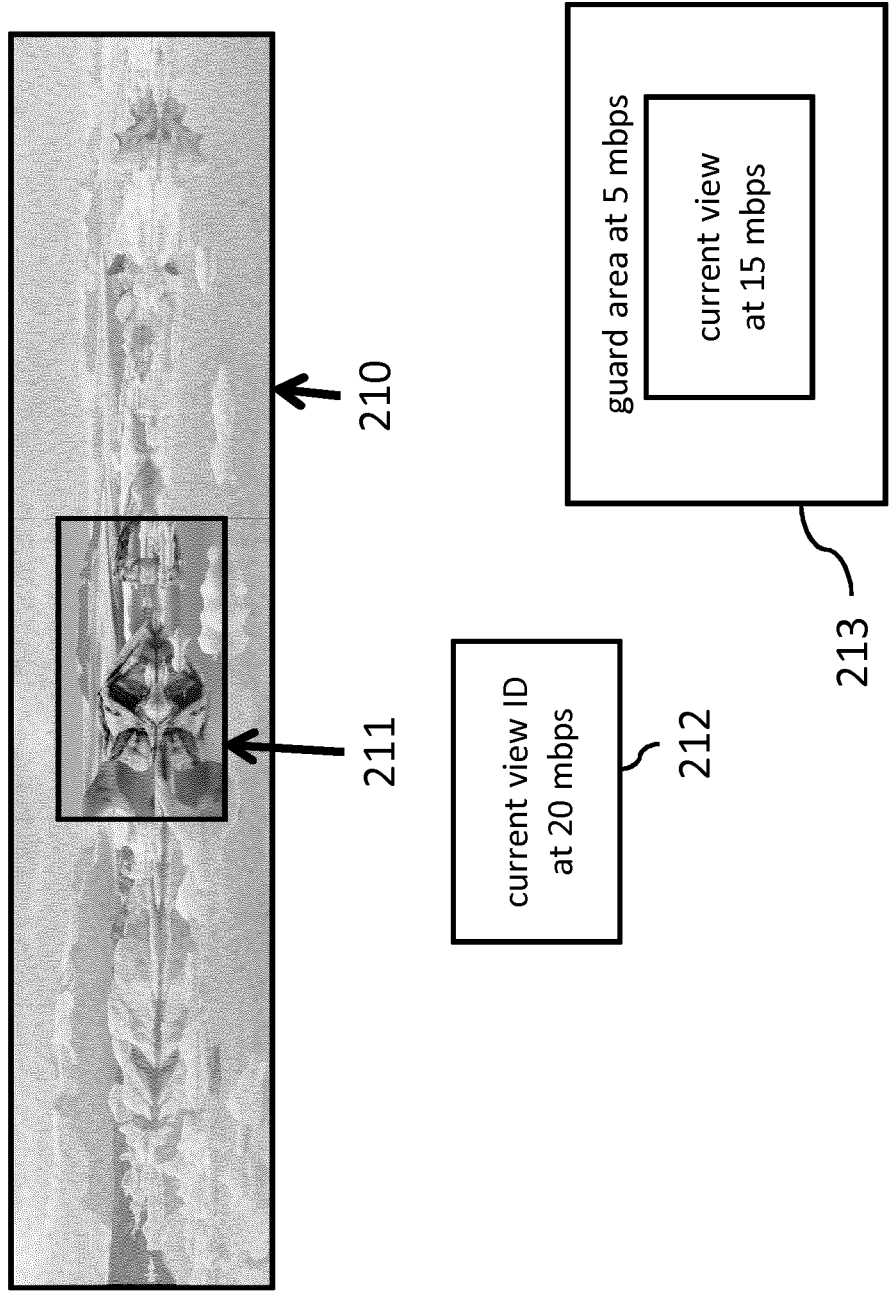
FIG. 8 illustrates a Field of View streaming process.

FIG. 8 illustrates a Field of View streaming process. The figure shows a complete 360° overview 210 of a VR video, for example a spherical video encoded in a rectangular frame. In the VR video a current viewport 211 indicates the part that is being looked at (also called the current view). The current view has to be displayed for the user and only this part needs to be send to the VR headset. In the Figure a first set of image data 212 schematically represents the image data needed to display the current view. It is also indicated that the streaming process provides the image data 212 using a transfer data rate of 20 Mbit per second (Mbps), which is an example of a bandwidth limitation for streaming through a network.

In FoV based VR streaming new content needs to be made available as quickly as possible when the VR user rotates his (or her) head. The latency with which this is done is usually called motion-to-photon latency. Such movements may be detected using one or more sensors in or near the VR headset, such as a gyroscope or an external camera facing the VR user. In a video streaming process, it will take some time before a new video can be started, because of the delays inherent in video streaming (e.g. requesting delays, encoding delays, network delays, decoding delays). When requests for a new video are sent only after the head rotation is detected, new video material for the new viewing direction will only be available after some time. An example of dealing with this is to stream the current field of view in high resolution (i.e. using most bandwidth for this part) and stream some (or all) of the adjacent parts in lower resolution (i.e. stream guard bands using some bandwidth), as shown in FIG. 8 by a second set of image data 213 schematically representing the image data needed to display the current view and possible future views shifted in an arbitrary direction with respect to the current view. The additional area of the image data around the area for the current view may be called guard area or guard bands. The guard area is made available by the streaming process, so any head movement requiring a new view can be accommodated as long as the amount of head movement has a new view within the guard area. In this example, the guard area may be provided in a lower quality (using 5 Mbps) than the current view (using 15 Mbps). So, in FoV based streaming there may be a trade-off between motion-to-photon latency and content quality.

The controller 122 as shown in FIG. 1 is further configured to determine target image data needed for rendering a future view based on the predicted head movement. When a head movement is predicted, as described in the above, the controller determines how the head will be oriented in the near future, e.g. a few hundred milliseconds from the current time. For the future head orientation, the future view is determined and is, at least, to be covered by the target image data. The area covered by the future view may be called target area.

To cope with inaccuracies of the prediction or deviations in the actual head movements, the target image data may include further image data around the future view. The area covered by the additional image data may be called guard area, as illustrated in FIG. 8. The target image data may comprise the target area where the future view is expected and the guard area. So determining the target image data may comprise determining the guard area which is spatially adjacent to the target area. Also, determining the guard area may comprise determining the guard area for accommodating a difference between the predicted head movement and an actual future head movement. Furthermore, determining the guard area may comprise determining the guard area in dependence of an estimated accuracy of the predicted head movement, and/or adjusting the size of the guard area in dependence of the estimated accuracy of the predicted head movement, while reducing the size at increasing accuracies. Furthermore, the quality of and hence the bitrate used for the guard area may also be determined in dependence on such estimated accuracy.

The controller is further configured to determine a second configured setup for providing the target image data, and to execute the streaming process according to the second configured setup. When a head movement is predicted, the target data will differ from the first image data as provided by the first configured setup. So, for providing the target image data in the near future before the head movement actually occurs, so as be able to display the required view when said head movement occurs, the streaming process is to be adapted earlier, as the streaming process inherently has delays. The required future configured setup, which is needed to provide the target image data for rendering the future view may be called the future configured setup or second configured setup.

Although the above adaptation of the configured setup may be executed once or at the command of an external source, the processor may be arranged to continuously repeat the above adaptation of the configured setup, e.g. in intervals of a predetermined length. The adaptation cycle may also be controlled based on the brain signals, e.g. when detecting a brain activity above a predetermined threshold, the cycle may be initiated.

In the controller, a predictor unit for predicting the head movement may be implemented based on a classification model. The classification model may be trained using the EEG data in sample periods of a predetermined length preceding a predetermined head movement. Also, the classification model may be trained based on head movement data derived from successive actual head orientations and corresponding predicted head movements. Further it is not excluded that the classification model can further improve, for example optimise the sample periods for certain head movements, possibly resulting in sample periods of variable length and/or differing per class of head movement.

Training EEG data may be gathered and pre-processed (filtered, re-referenced to the common average of all electrodes, baselined, down-sampled). Subsequently, epochs may be selected that either preceded a movement or not, where the epochs preceding a movement are further divided to train particular movements such as into 'leftward' and 'rightward' yaw movement, or other head movements. The classification model may be trained to distinguish between those types of epochs, such that if a sample of new EEG data is fed to the trained model, the model can indicate whether a movement is coming up or not. Support vector machine models may be used to distinguish between no movement and leftward movement epochs, between no movement and right, and between right and left (the latter was only used for intervals preceding a movement). Using epochs of 125 ms of EEG data coming from around 300 ms before movement onset, these epochs could correctly classify data that was withheld from training the model with an accuracy of respectively 73% (no vs left), 68% (no vs right) and 79% (left vs right). Overall, it is possible to make most of these distinctions across different moments in time before movement onset within the examined second already with a limited training, and increased accuracies can be realised.

Optionally, the model may provide multiple graded outputs for multiple possible head movements and using the multiple graded outputs for determining the target image data. Further improvements were achieved by using graded (probabilistic) rather than binary classification output. Improved timing accuracy can be reached by e.g. continuously streaming EEG epochs through a classifier trained on distinguishing 125 ms epochs originating from 300 ms before leftward movement onset to no movement intervals). Predicting whether a (left or right) head rotation is coming up or not has been found to be possible on the basis of EEG. Relevant distinguishing information may originate from asymmetries in the frontal electrodes as illustrated in the FIGS. 4-6. Hence higher order left- or rightward planning processes appear to have been exploited in this case.

Using the above described classification model, the time between the prediction of movement onset from EEG readings and the actual movement, is sufficient to request new streams containing the video content for the new viewing direction.

Figure 9:
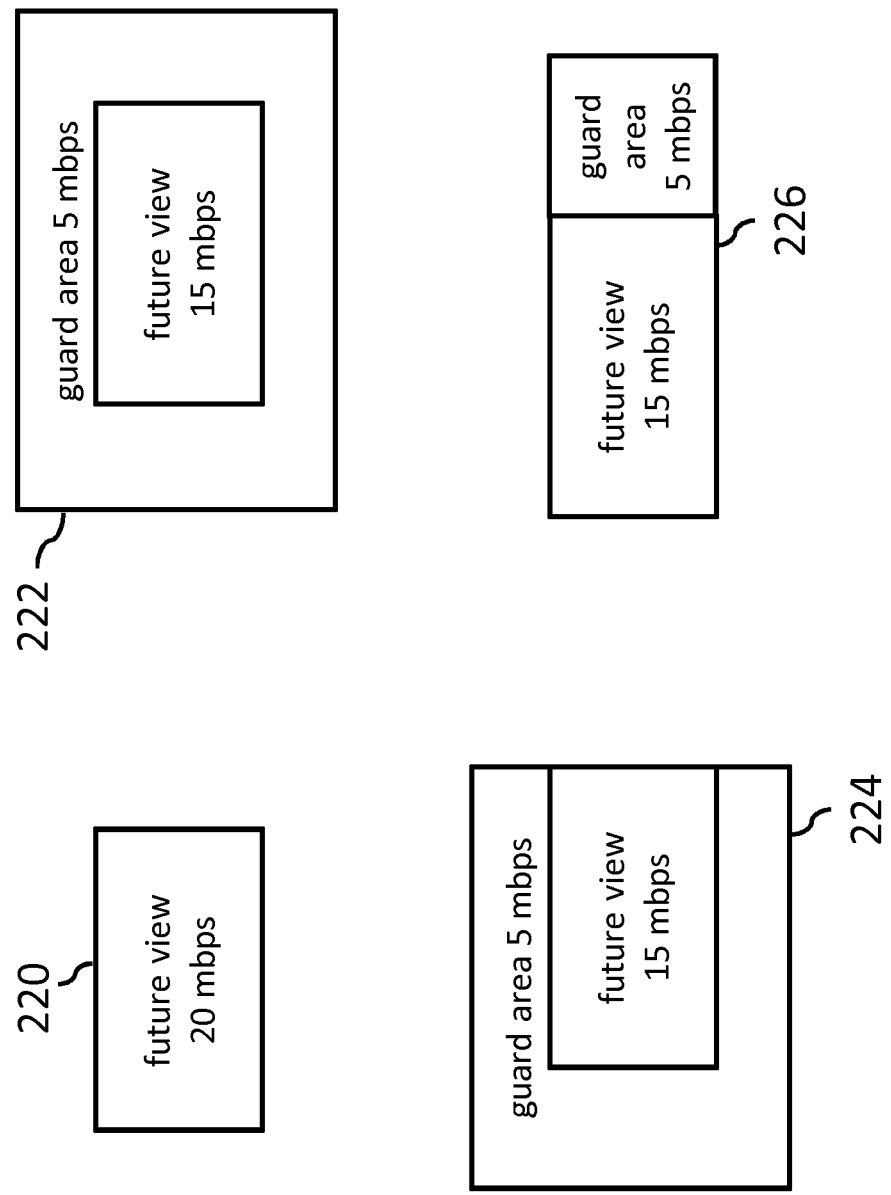
FIG. 9 shows examples of target image data according to respective configured setups for different predictions of head movement.

FIG. 9 shows examples of target image data according to respective configured setups for different predictions of head movement. Determining the guard area may comprise determining the guard area spatially adjacent in all directions around the image data of the first configured setup based on a predicted movement onset while the movement direction is not yet predicted. Also, determining the guard area may comprise determining the guard area spatially adjacent in a subset of directions to the image data of the first configured setup corresponding to a predicted movement direction. Also, determining the guard area may comprise determining the guard area spatially adjacent in a left or right movement direction to the image data of the first configured setup when a horizontal head rotation and a corresponding movement direction are predicted. Also, determining the guard area may comprise determining the guard area spatially adjacent in a direction above or below of the image data of the first configured setup when a vertical head rotation and a corresponding movement direction are predicted. The examples assume a certain available bandwidth, in the examples 20 Mbit per second, and illustrate optimizing this bandwidth. In the examples a first configured setup (not shown) may only have the current view streamed having current image data 212 or image data 213 some guard area as illustrated in FIG. 8. The next configured setup is based on a predicted head movement, as in the following example cases.

In a first example, it is predicted that no movement, and hence no onset, will occur. The first example target data 220 has a future view that coincides with the current view, and no guard area. All bandwidth is used to stream only what is currently viewed. Quality may be higher than for systems that always need a guard area as all bandwidth can be used for the future view. Alternatively, the same quality may be delivered while bandwidth may then be saved.

In a second example movement onset is predicted but the direction is yet unknown. The second example target data 222 has a future view that coincides with the current view, and a guard area to accommodate the predicted head movement. Part of the bandwidth is used to stream guard bands to make sure new content is available upon movement; the future viewport may be somewhat degraded in quality. This degrades the quality only for a short time right before or around the start of the predicted head movement. The user may not even notice this degradation, especially when he moves his head as predicted.

In a third example onset is predicted and also direction is predicted, but still not accurate. The third example target data 224 has a future view that is shifted with respect to the current view, and a guard area which may cover inaccuracy of the predicted direction and/or amount of rotation. For example, if the user is likely to rotate his head to the left, guard bands may be positioned mostly to the left in case the rotation is stronger or faster than predicted. A user may still include up- or downward movement as well, but is not expected to suddenly turn to the right. Limiting the guard area increases the quality of the new content after head rotation, as more bandwidth is used for the parts more likely to be displayed.

In a fourth example onset is predicted and also left yaw direction is predicted accurately. The fourth example target data 226 has a future view that is shifted with respect to the current view, and a guard area still covering the current view to cover inaccuracy of the amount or speed of rotation, or inaccuracy in the onset. For example, If the direction is predicted quite accurately, only those streams a user will actually use need to be sent, further increasing the quality of the parts that will be needed after head rotation.

The determining the second configured setup may further comprise having the second configured setup provide the image data for the guard area at a lower quality than the quality of the image data for the area corresponding to the current view. Also, the second configured setup may provide the image data for at least part of the target area at a lower quality than the image data of the current view according to the first configured setup when a head movement is predicted. Also, the second configured setup may provide at least part of the target area at a higher quality than the image data of the current view according to the first configured setup when a deceleration of head movement is predicted for the second configured setup. E.g. when a user is ending his or her head movement, less or no guard areas are needed anymore and most or all bandwidth can be used for the target area.

Figure 10:
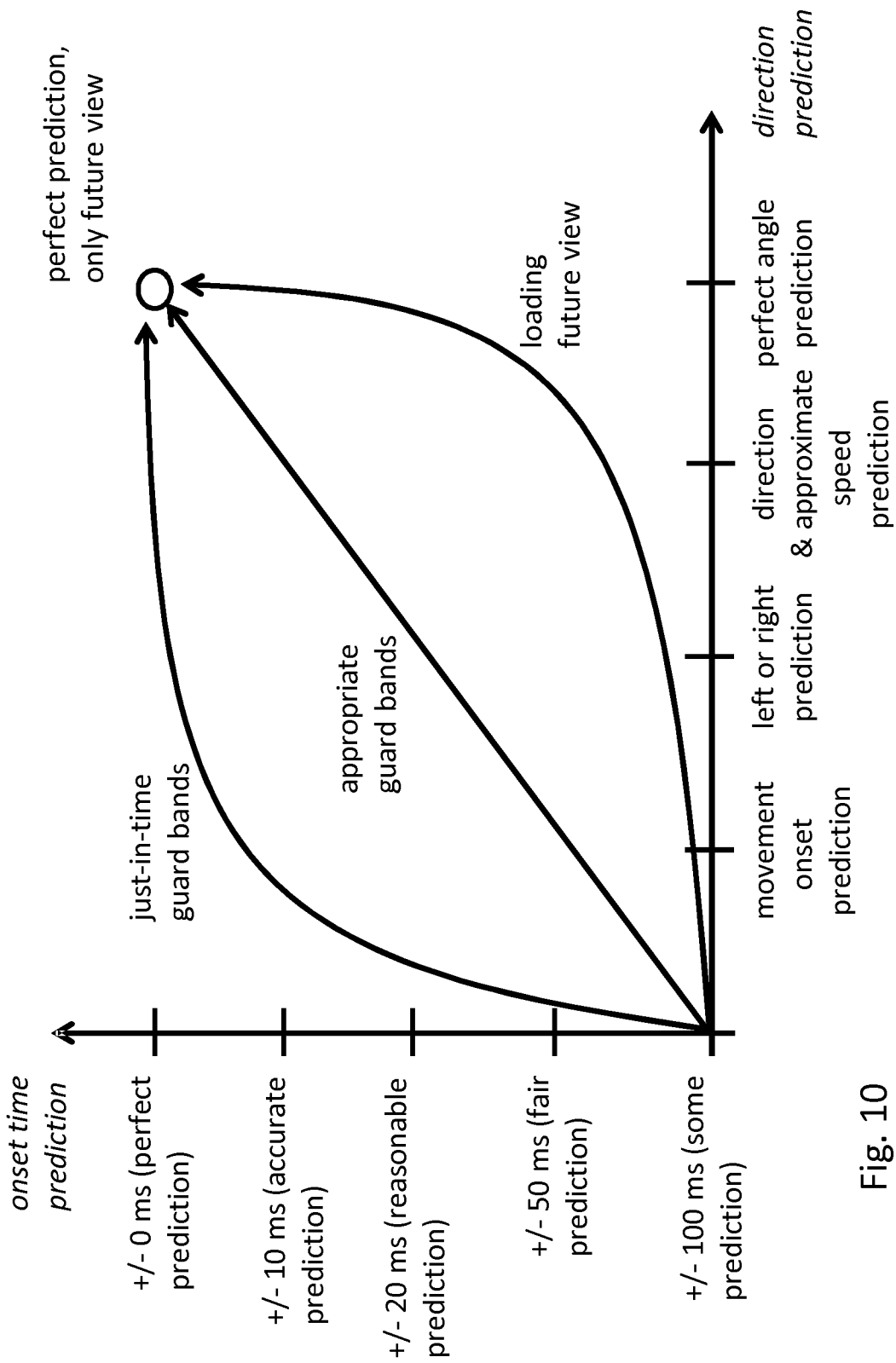
FIG. 10 shows a diagram that illustrates accuracy of prediction.

FIG. 10 shows a diagram that illustrates accuracy of prediction. In the Figure on the horizontal axis the accuracy of the direction prediction is indicated. On the vertical axis, the accuracy of the onset time prediction is indicated. In the adapted configured setup, actions and parameters are controlled in dependence on the accuracy of the predictions of onset and direction, as illustrated in the Figure. If the prediction is very accurate in time, the system can request the image data for the future view and guard bands just-in-time, while taking into account video streaming delay uncertainties. If the prediction is less accurate in time, streaming of a guard area may be configured earlier to make sure the image data arrives in time, at the cost of some bandwidth usage. If the prediction in direction is very accurate, i.e. down to the rotation angle, only the additional parts that are needed for the future view have to be streamed, i.e. loading a shifted future view in combination with some parts of the current view that still may be needed in dependence of inaccuracy of the onset timing. So the predicted future viewport and a guard area covering the current (older) viewport may be streamed, e.g. the current (older) viewport may still be streamed in lower quality. 'Older' added in brackets indicates that the current viewport is not 'current' anymore when the future viewport has become 'current'. Effectively a higher quality image upon head rotation in predicted direction is achieved, while potentially a lower quality image is displayed when prediction is wrong. If the prediction of direction is less accurate, guard bands in other areas may be configured as well. For a perfect prediction, in time and direction and amount of movement, only the corresponding future view has to be available just-in-time.

Figure 11:
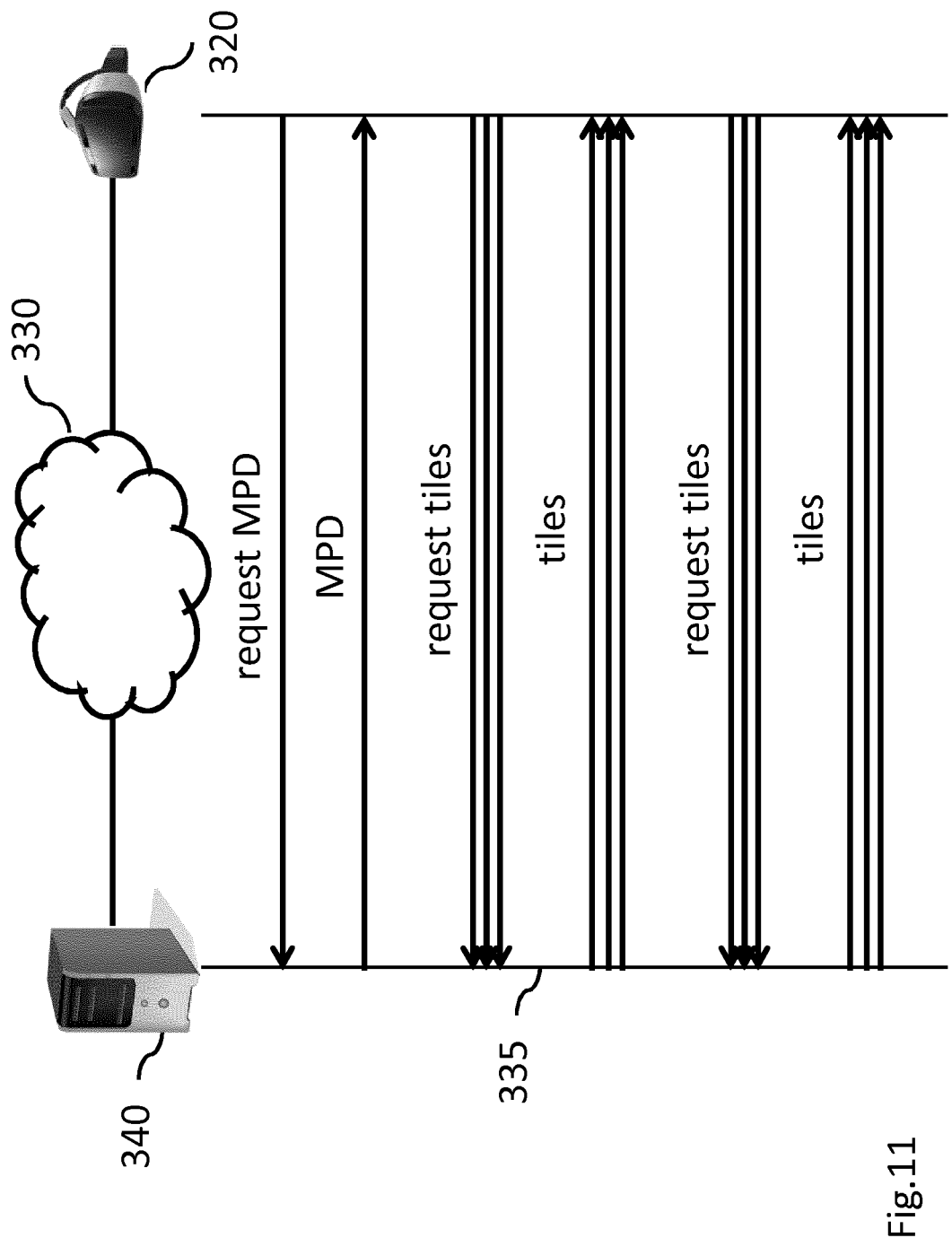
FIG. 11 shows an example of a streaming process based on MPEG DASH.

FIG. 11 shows an example of a streaming process based on MPEG DASH. The Figure shows a VR source 340 coupled via a network 330 to a VR rendering device 320 representing a VR client. The VR rendering device may be a head mounted display in combination with electronic circuitry for processing the VR video as described with FIG. 1. The Figure in a simplified way shows relevant parts of a streaming process 335 based on MPEG DASH. The client first retrieves a Media Presentation Description describing tiles and their spatial relationship, and then retrieves the appropriate tiles.

Figure 12:
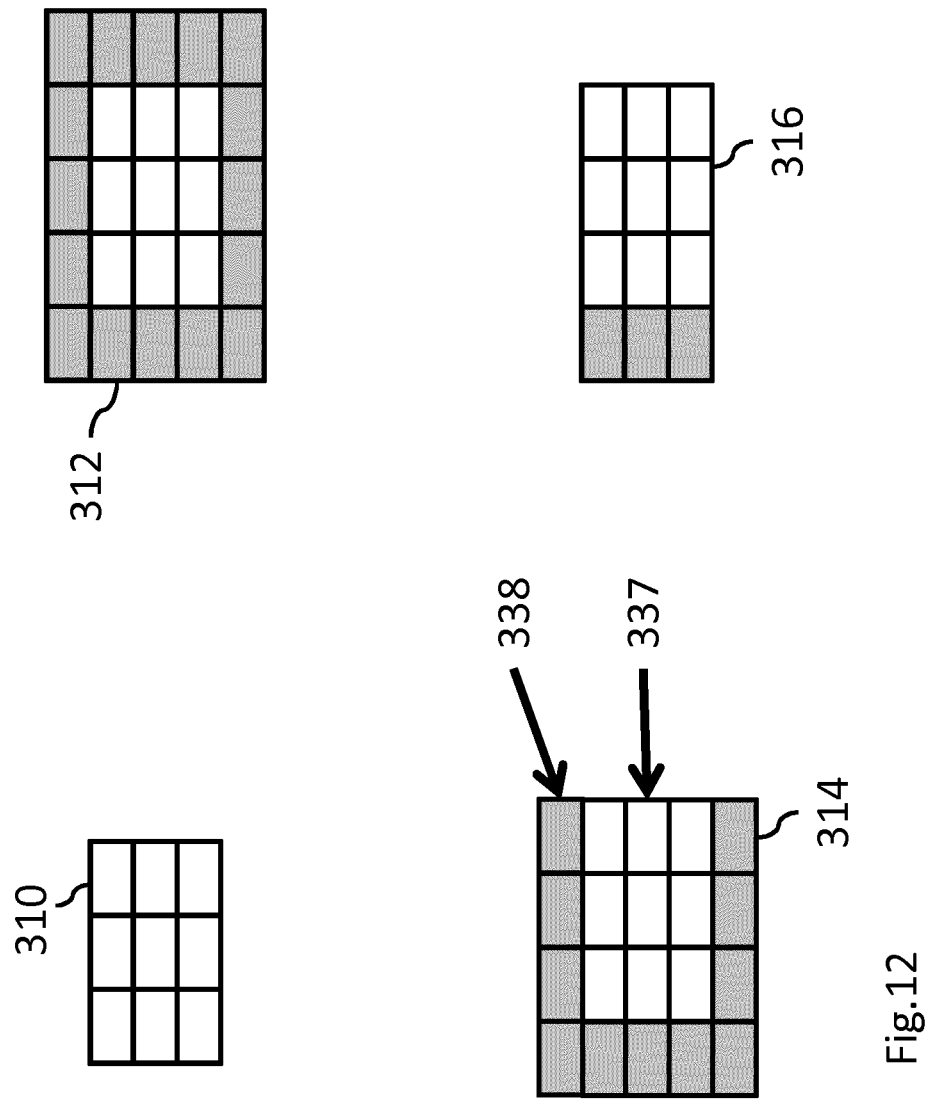
FIG. 12 shows examples of target image data according to respective configured setups of a streaming process based on MPEG DASH for different predictions of head movement.

FIG. 12 shows examples of target image data according to respective configured setups of a streaming process based on MPEG DASH for different predictions of head movement. The examples assume a certain available bandwidth, in the examples 20 Mbit per second, and illustrate optimizing this bandwidth.

MPEG DASH and tiled streaming is known in the art, e.g., from Ochi, Daisuke, et al. "Live streaming system for omnidirectional video" Virtual Reality (VR), 2015 IEEE. Briefly speaking, using a Spatial Relationship Description (SRD), it is possible to describe the relationship between tiles in an MPD (Media Presentation Description). Tiles may then be requested individually, and thus any particular viewport may be requested by a client, e.g., a VR rendering device, by requesting the tiles needed for that viewport. In the same way, guard band tiles may be requested. FIG. 12 shows tile-based representations of a VR video, while showing a viewport 337 which comprises a first subset of tiles shown in white. In the depiction of the tile-based representation of the VR video and the current viewport, a coordinate system is used to indicate the spatial relationship between tiles, e.g., using a horizontal axis from A-R and a vertical axis from 1-6. It is noted that in this and following examples, for ease of explanation, the viewport is shown to be positioned such that it is constituted by a number of complete tiles, e.g., by being perfectly aligned with the grid of the tiles. Typically, however, the viewport may be positioned such that it comprises one or more partial tiles, e.g., by being misaligned with respect to the grid of the tiles. Effectively, the current viewport may represent a crop of the image data of the retrieved tiles. A partial tile may nevertheless need to be retrieved in its entirety. It is noted that the selection of tiles for the current viewport may be performed in a manner known per se in the art, e.g., in response to a head tracking, as also elsewhere described in this specification. FIG. 12 also shows a guard area 338 for the viewport 337.

Namely, a set of tiles shown in grey is adjacent to the viewport and thereby provides spatially adjacent image data for the image data of the tiles of the viewport.

To clearly understand the effect of the invention, this example uses the following numbers. Each tile is 640×400 resolution, the viewport consisting of 3 by 3 tiles is thus 1920×1200 resolution. Each tile is available in 4 quality levels, indicated in bitrates of 2 Mbps (Mbit per second), 1.5 Mbps, 1 Mbps and 0.5 Mbps. The total available bandwidth is assumed to be 20 Mbps. In the examples a first configured setup (not shown) may only have the current view streamed having current image data 212 or image data 213 some guard area as illustrated in FIG. 8. The next configured setup is based on a predicted head movement, as in the following example cases.

In a first example, it is predicted that no movement will occur. The first example target data 310 has a future view that coincides with the current view, and no guard area. All bandwidth is used to stream only what is currently viewed. All 9 tiles can be requested at the highest bitrate available, total bandwidth used is:

9 tiles*2 Mbps=18 Mbps

In a second example movement onset is predicted but the direction is yet unknown. The second example target data 312 has a future view that coincides with the current view, and a guard area to accommodate the predicted head movement. Part of the bandwidth is used to stream guard bands to make sure new content is available upon movement; the future viewport may be somewhat degraded in quality. The 9 tiles for the viewport can be requested at 1 Mbps, and the 16 guard band tiles at 0.5 Mbps. Total bandwidth used is: 16 tiles*0.5 Mbps+9 tiles*1 Mbps=17 Mbps. This configured setup shows a degradation in quality, as only movement onset is predicted but the direction is not.

In a third example onset is predicted and also direction is predicted, but still not accurate. The third example target data 314 has a future view that is shifted with respect to the current view, and a guard area which may cover inaccuracy of the predicted direction and/or amount of rotation. Here, less guard band tiles are used; thus, a higher quality viewport can be requested. 9 tiles are requested at 1.5 Mbps and 11 tiles are requested at 0.5 Mbps. Total bandwidth used is:

11 tiles*0.5 Mbps+9 tiles*1.5 Mbps=19 Mbps.

In a fourth example onset is predicted and a right yaw direction is predicted accurately. The fourth example target data 316 has a future view that is shifted with respect to the current view, and a guard area still covering the current view to cover inaccuracy of the amount or speed of rotation, or inaccuracy in the onset. With more accurate direction prediction, only 3 guard band tiles need to be requested. In this case, all tiles can be requested at 1.5 Mbps. Total bandwidth used is:

(3+9)tiles*1.5 Mbps=18 Mbps.

Figure 13:
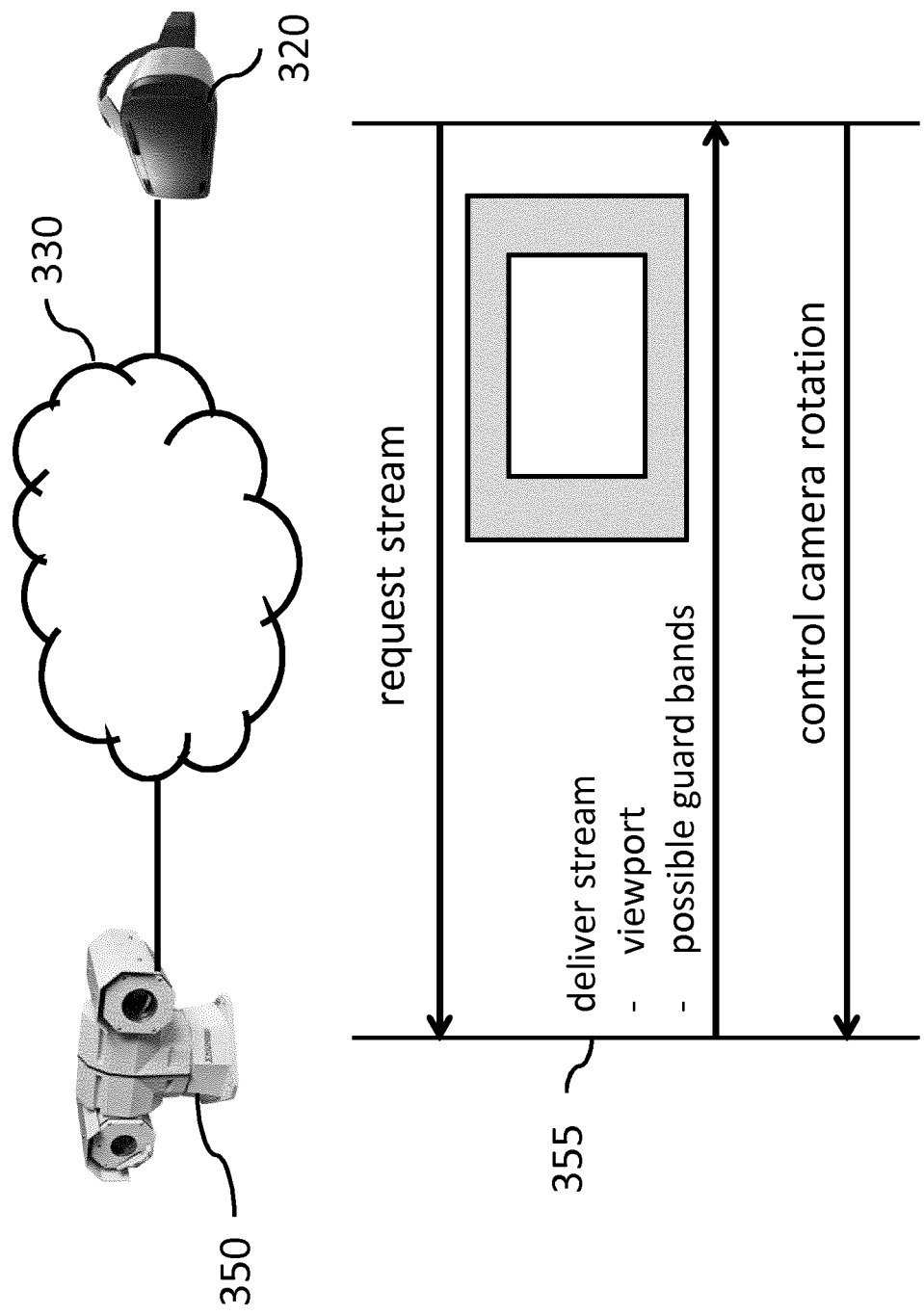
FIG. 13 shows an example of a streaming process for tele-robotics.

In an embodiment, the determining a second configured setup further comprises determining prediction data indicating at least one of the predicted head movement, a predicted head movement direction, a predicted head movement onset, a predicted head movement ending, the target image data, the future view, etc. The prediction data may be transferred to the video delivery chain and/or the VR source for enabling adapting the streaming process according to the predicted head movement. For example, the streaming process comprises obtaining the VR video from a VR server and processing the VR video at the VR server to provide the one or more streams and executing the second configured setup comprises transferring the prediction data to the VR server for enabling the VR server to adapt processing of the VR video to provide the one or more streams according to the prediction data FIG. 13 shows an example of a streaming process for tele-robotics. In this example, the VR source is a robot with a controllable camera 350. In this case, the PTZ (Pan Tilt Zoom) camera is a wide-angle camera delivering the current viewport and some additional guard band areas via a network 330 to a VR rendering device 320 provided with EEG based control. So, the streaming process comprises obtaining the VR video from the camera oriented towards the scene located at a VR source facility. The prediction data as such, or commands based on the prediction data, are transferred to the VR source via the network. Determining a second configured setup may further comprise determining at least one command based on the prediction data. Executing the second configured setup may further comprise transferring the command to the VR source to enable controlling the camera.

When the EEG measurements predict movement in a certain direction, at the VR source a receiver unit of the prediction data or commands can control the camera to start rotating before the user actually rotates his head. Part of this control is instructing on how far to rotate in which direction, and when to start rotating with what speed. This will cause the camera to rotate first, capture and transmit video images to the receiver. When the user actually moves his head, the HMD will have received the proper images to display for the new orientation.

With perfect prediction, no guard bands will be needed, as the receiver can control the camera in such a way that the camera supplies the images for the proper orientation at the time the receiver is facing that orientation. With non-perfect predictions, a guard area is added that helps to make sure that the actual shifted view due to user head rotation stays within the target image data as provided by the PTZ camera.

Figure 14:
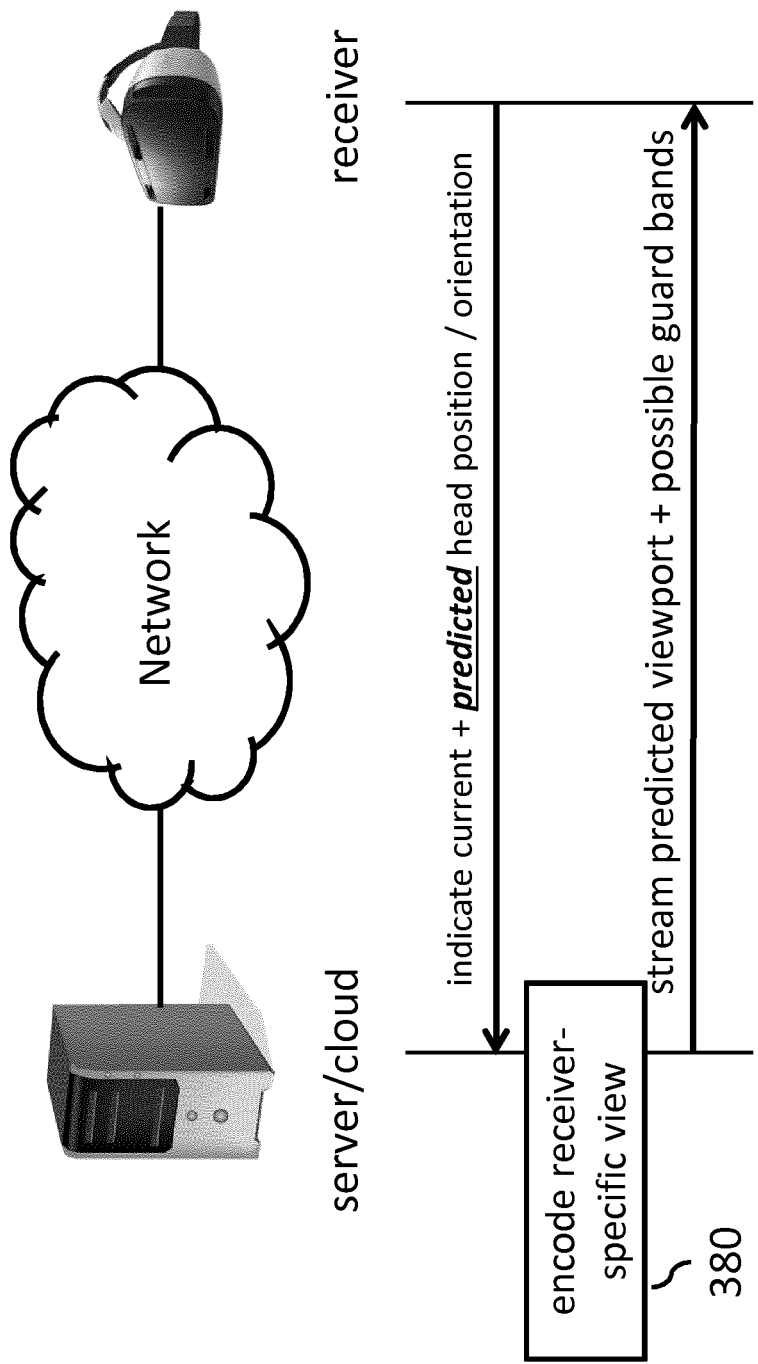
FIG. 14 shows an example of a streaming process transferring prediction data.

FIG. 14 shows an example of a streaming process transferring prediction data. In the process, while executing the second configured setup based on the EEG data, the VR rendering devices indicates the current view and the predicted head position/orientation, e.g. using the above prediction data. The headset will indicate its current position and/or orientation to the VR server which may be in the cloud. In a sub-process 380 a specific view is encoded for the VR rendering device based on the prediction data. In the sub-process the server may carry out a projection on the available VR video as elucidated below, to extract the predicted viewport. The server then encodes the specific view and sends the image data to the HMD. The server may or may not apply some guard bands to the predicted viewport. If there are no guard bands, the HMD will just display the image received. If there are guard bands involved, the server will need to tell the HMD for what orientation the predicted viewport is delivered. The HMD can then, upon displaying, calculate the current orientation and extract the viewport for that current orientation from the delivered image data. This is what an HMD would need to do anyway when a full-360 VR video is delivered to the headset. In such an approach, there is no switching between various streams, as the server continuously encodes the proper image data in the stream transmitted to the receiver.

In an example embodiment, the VR rendering device may indicate the current position and/or orientation of the head or HMD to the server, and also indicate a prediction. The prediction may contain both space and time: at what point in time is the HMD expected to be moved/rotated in what direction? The server can take this prediction into account when extracting the viewport. Normally this prediction will be used to either stream only the current viewport when no movement is predicted, or stream the future viewport and include a guard area once movement is predicted. Alternatively, if the prediction is very accurate, only the predictions in orientation could be supplied to the server, and only the predicted viewport may be extracted and delivered to the receiver.

Figure 15:
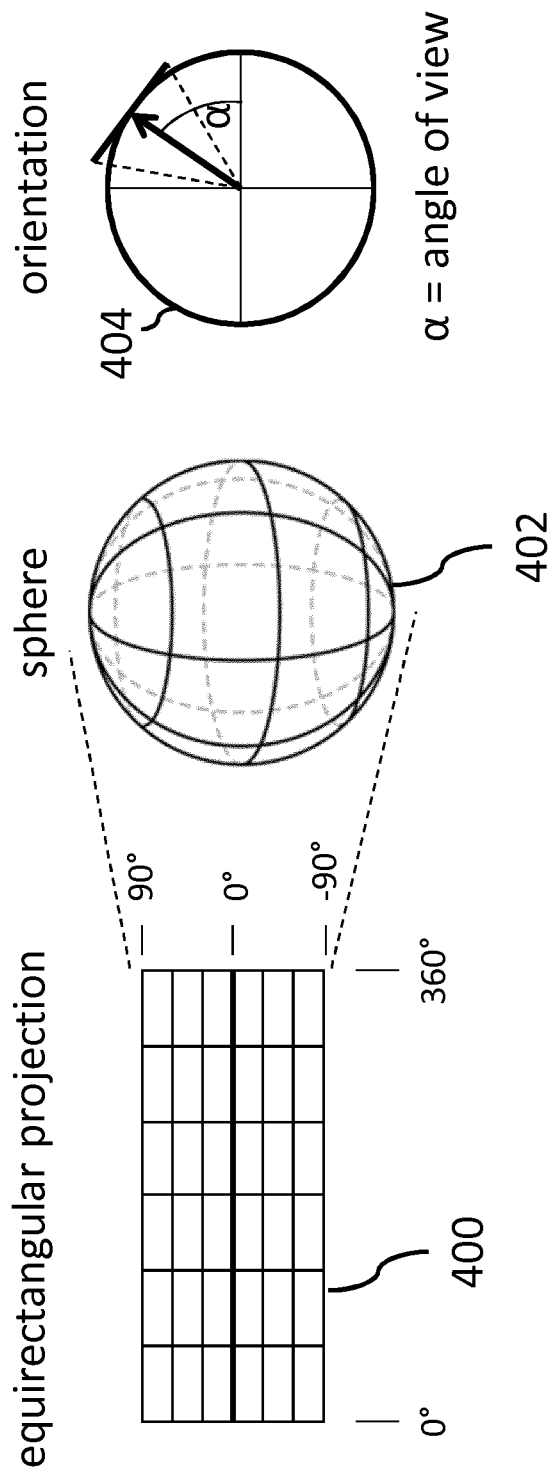
FIG. 15 shows an example of a VR video in equirectangular projection.

FIG. 15 shows an example of a VR video in equirectangular projection. The Figure illustrates what display processing is required to render a view for an HMD from a VR video 400 in equirectangular projection. The flat image needs to be decoded and projected on a sphere 402. Next, the current orientation 404 of the head needs to be determined, i.e. the angle of view needs to be determined. The HMD may have sensors to determine the orientation of the head. In the figure the display processing is depicted in 2D, but rotations can be done by the users on 3 axis: yaw (left/right rotation), pitch (up/down rotation), roll (z-axis rotation, i.e. one eye up the other down). Based on the head orientation the current view to be offered by the HMD can be determined. The view is extracted from the image data and sent to the HMD.

In practice, predicting a head movement may further comprise predicting a head movement due to a change of a focus of attention position based on the EEG data. The focus of attention may move in any direction and is indicative for an upcoming head movement in that direction. The predicting may further comprise predicting a yaw movement rotating the head around a vertical axis based on the EEG data; and/or predicting a roll movement rotating the head around a view axis in a view direction based on the EEG data; and/or predicting a pitch movement rotating the head around a lateral axis perpendicular to the view direction based on the EEG data. Also, other head movements may be predicted, like predicting a head translation based on the EEG data and/or predicting a head movement speed based on the EEG data, and/or predicting a head movement angle based on the EEG data.

Figure 16:
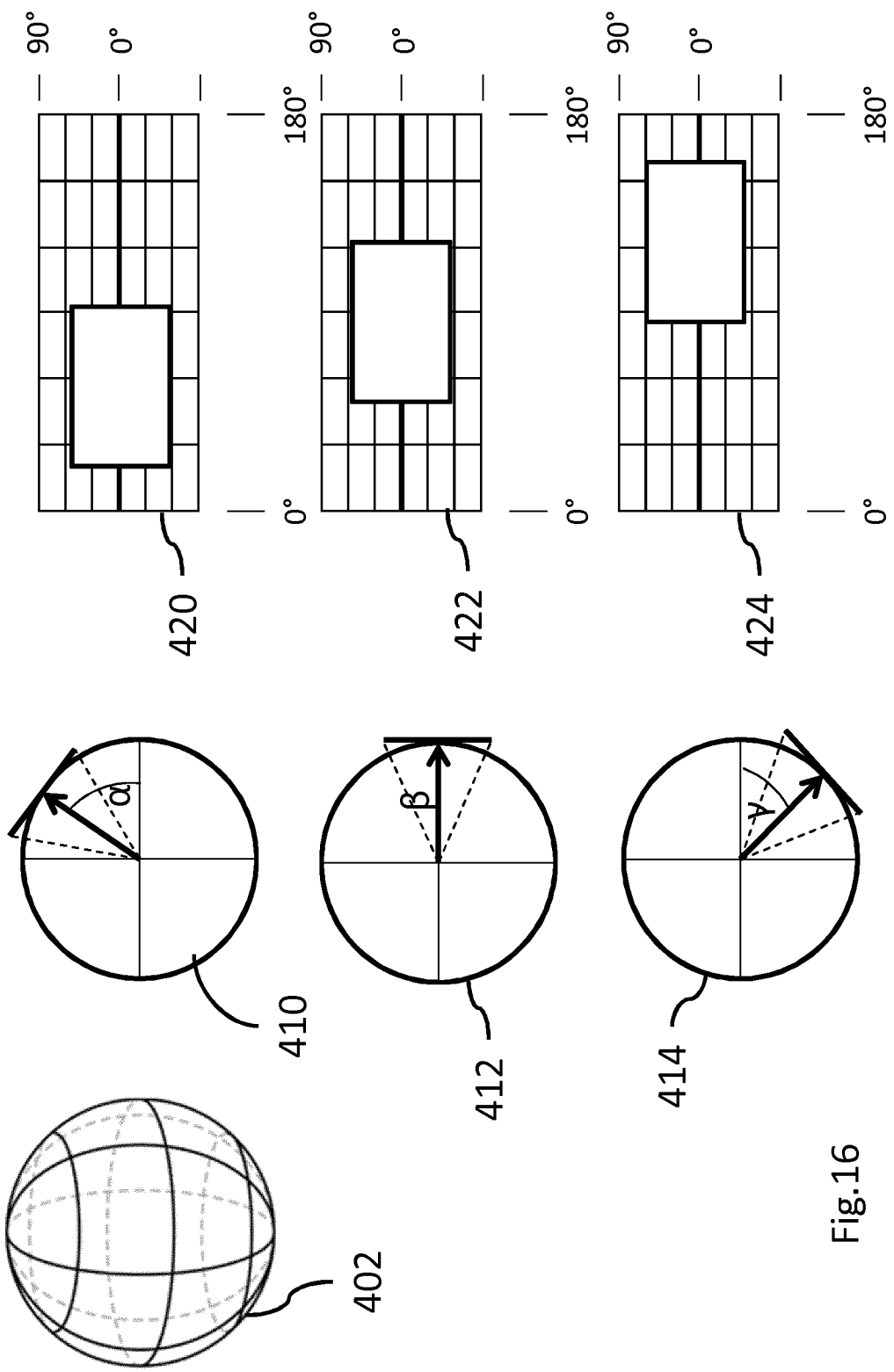
FIG. 16 shows an example of multi-encoding a VR video.

FIG. 16 shows an example of multi-encoding a VR video. The Figure illustrates processing to encode multiple versions of the same content. The flat image needs to be decoded and projected on a sphere 402. A first projection 410 has a first head orientation at an angle α=first angle of view. A corresponding encoding 420 is generated based on the first projection. A second projection 412 has a second head orientation at an angle β=second angle of view. A corresponding encoding 422 is generated based on the second projection. A third projection 414 has a third head orientation at an y=third angle of view. A corresponding encoding 424 is generated based on the third projection.

In the multi-encoding approach, multiple versions of the same content may be created, as shown in FIG. 16. For various potential viewports, a separate encoding is created. In such an encoding, the viewport itself is encoded in a high resolution and the other parts may be encoded in lower resolution (or lower quality, etc. i.e. using less bandwidth). The entire encoding can be 360 degree or may be less, e.g. 180 degrees as shown in FIG. 16. The encoding may either include a guard area or even the entire spatial VR video in a lower quality.

The encodings may have multiple different quality/resolution levels, e.g. a gradually decreasing quality further away from the viewport. The encodings may be done in an equirectangular format, but may also use other types of encodings, e.g. cube maps or pyramidal encoding. In practice, many different encodings may be created, e.g. 30 different encodings for a single 360 VR video.

Figure 17:
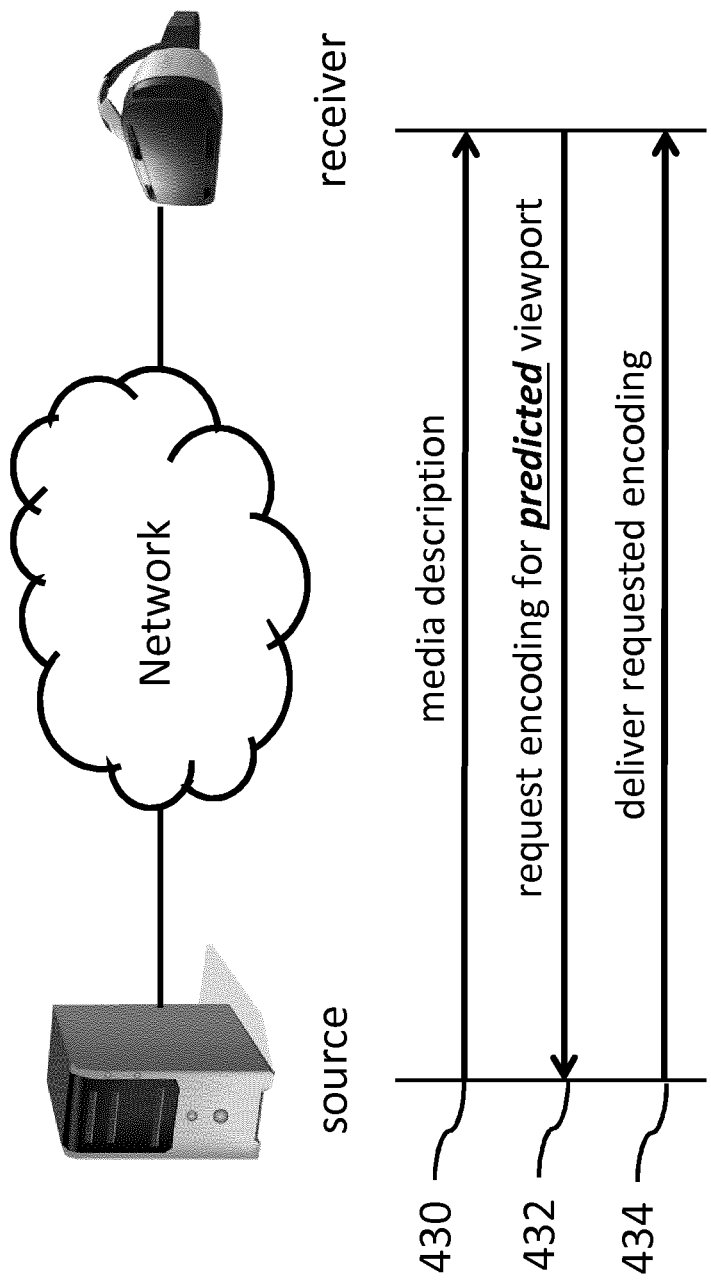
FIG. 17 shows an example of a streaming process based on multi-encoding.

FIG. 17 shows an example of a streaming process based on multi-encoding. Initially a VR source sends, via a network to a VR receiver, a descriptor message 430 that contains a media description of the VR video. In the streaming process, while executing the second configured setup based on the EEG data, the VR rendering device sends a request message 432 to the VR source to request an encoding for a predicted viewport. In a response stream 434, the source delivers the requested encoding.

The Figure illustrates that the HMD may receive a media description first, describing the various encodings and information on the spatial orientation. The media description may describe for each encoding how to retrieve that specific version of the content, and what the orientation is for which this content is encoded. Upon predicted head rotation, an HMD may request a different encoding. Switching to a different encoding makes sense if that new encoding's orientation is closer to the HMDs predicted orientation.

Adapting the streaming process to deliver a new encoding will take time, as it takes time for the request to reach the server and for the new encoding to be delivered to the receiver, and decoded and displayed. Thus, if a head movement threshold is crossed that engages a new encoding, it will take time before the image quality is increased for the new orientation. By using the predicted head orientation, the switch to a different orientation can be made earlier, so that the new encoding is available at the moment the orientation actually changes, or at least very close to that moment.

Also, different encoded versions for different predictions can be used, for example the following:
No movement encoding, using most bandwidth for the main view of the encoding and very low bandwidth for the surroundings.
Left-movement encoding, using more bandwidth to the left of the main view of the encoding and less bandwidth to the right of the main view.
And similar, right-movement encoding.

Figure 18:
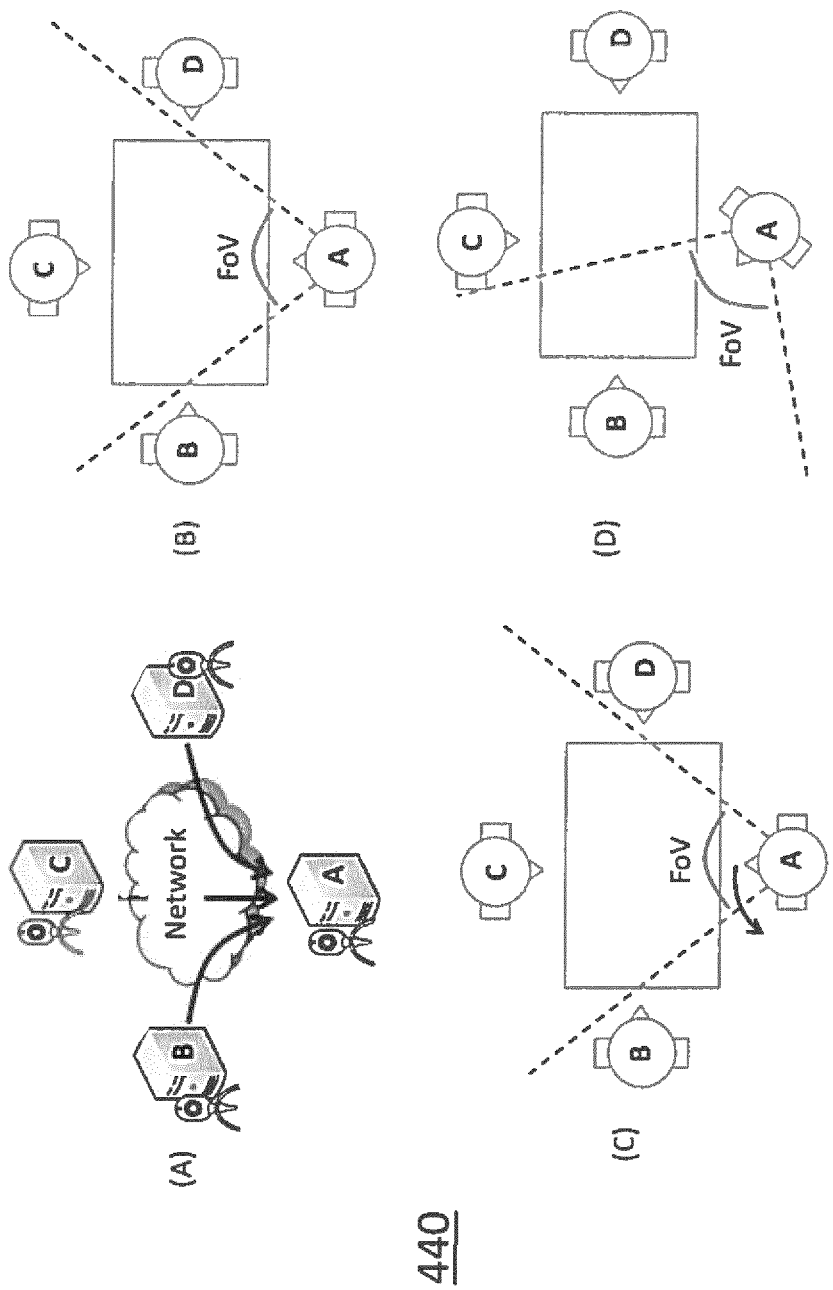
FIG. 18 shows an example of a streaming process for VR conferencing.

FIG. 18 shows an example of a streaming process for VR conferencing. The streaming process may comprise obtaining the VR video from multiple locations, respective image data from the respective locations together constituting the scene and each location providing at least one respective stream. Determining the second configured setup may further comprises including in the second configured setup a respective stream when the target image data comprises at least part of the respective image data. Also, determining of a further configured setup may comprise excluding from the further configured setup a respective stream when the target image data no longer comprises the respective image data. For example, the Figure shows a conferencing arrangement 440 having 4 users meeting in a virtual environment, which may be called a VR conference session. Each of the users has a computer or VR processor (labelled A-D for users A-D), and is wearing a headset (not shown) or is situated in a VR projection room. Each user location has one or more cameras for getting image data of that user. Each user's VR processor sends image data to each other user, for inclusion in the respective virtual environment. In the Figure, sub-picture (A) shows that the systems of users B, C and D each send image data to user A, which would happen in a conventional system. But, when applying the above described prediction based control, not all image data has to be sent all the time.

Sub-picture (B) shows the virtual environment with the four users seated around a table. User A is looking straight ahead at user C, i.e. his current viewport or Field of View (FoV) is limited to a part the virtual environment, e.g. a table and background, here assumed locally available on the system of each user. The background is not relevant for the prediction control, and image data is only received from user C. If no head rotation is predicted, the users B and D do not have to send image data to user A as this image data would not be displayed anyway. In sub-picture (C) it is shown that a head rotation to the left is predicted. Because user B was just outside the current FoV of user A, that image data is now needed. Because the prediction precedes the actual movement, the system of user B is signaled immediately after the prediction of movement onset to the left to start sending image data to the system of user A. The new target image data may arrive in time to be displayed once the head rotation is actually taking place. In this way, network bandwidth is saved as only image data is sent over the network that is actually used or has a high chance of being used, as the prediction accuracy may be less than 100%, There are various permutations of this situation, similar to those described elsewhere in this invention. Image data can be sent in lower quality when there is a lower chance of it being used and in higher quality when there is a higher chance of it being used. Users may only send a part of their image to the other users and not always the complete image as captured by their camera, and may use the idea of applying guard bands as elsewhere described. Only movement onset may be predicted, so sending of image data is suppressed when a user is not in view and no movement is upcoming, and the sending of image data may commence when movement onset is predicted. Measurements may be made of the delays in signaling and sending of image data, so the signaling based on movement predictions may be performed in a just-in-time manner. If no user is looking at a particular other user, that particular other user may even stop his capture entirely, thus not only saving bandwidth but also saving local processing and thus local energy consumption.

Figure 19:
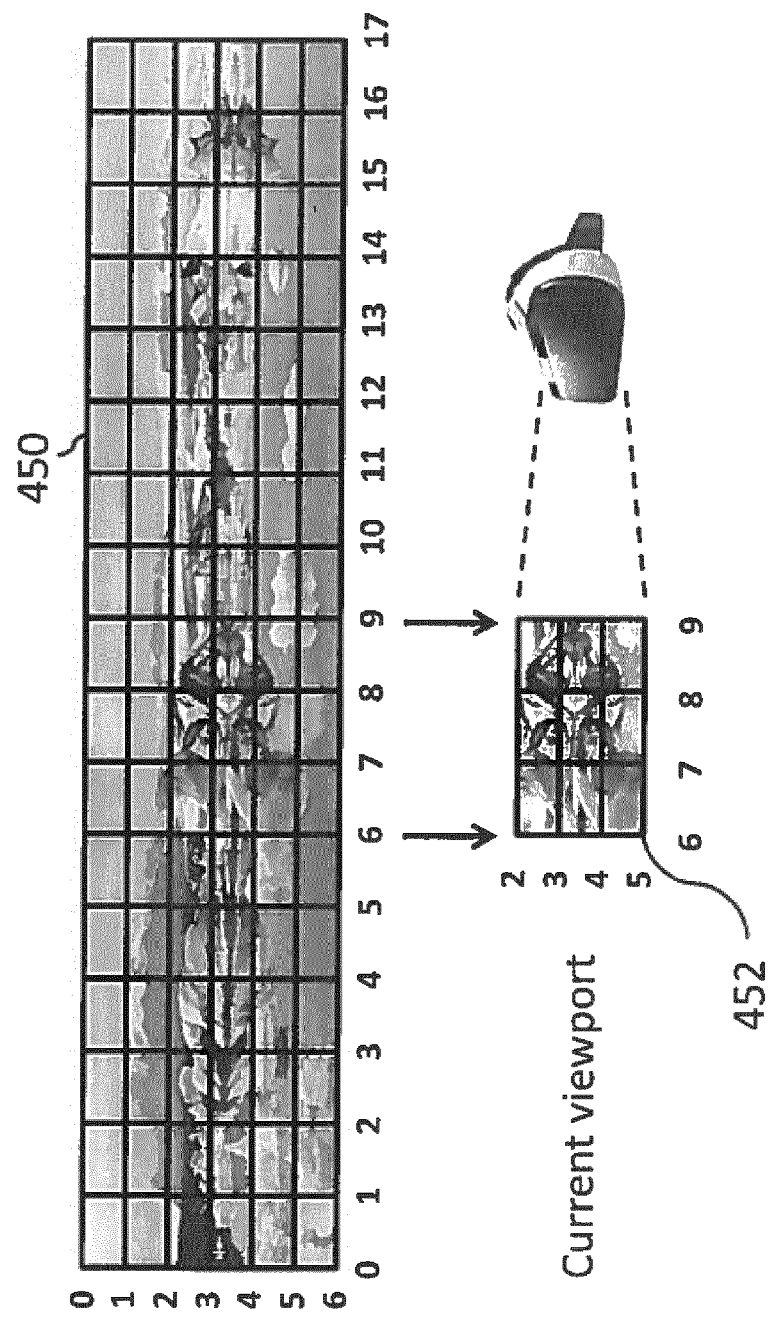
FIG. 19 shows an example of an equirectangular image.

FIG. 19 shows an example of a tiled streaming process. The following example embodiments are based on MPEG-DASH, but other FoV encoding systems like those of Facebook (Pyramidal encoding) or cloud-based FoV rendering may be used as well.

In MPEG-DASH, the concept of tiles is implemented using a Spatial Relationship Description (SRD), as described in ISO/IEC 23009-1:2015/FDAM 2:2015(E) (available in draft). Such SRD data may be an example of the spatial relation data. DASH allows for different adaptation sets to carry different content, for example various camera angles or in case of VR various tiles together forming a 360 degree video. The SRD is an additional property for an adaptation set that describes the width and height of the entire content (i.e. the complete canvas), the coordinates of the upper left corner of a tile and the width and height of a tile. In this way, each tile can be indicated and separately requested by a DASH client supporting the SRD mechanism. FIG. 19 shows an example of a tiled VR video. The following data structure may describe the upper left tile of the current viewport:

| Property name | Property value | Comments |
| --- | --- | --- |
| source_id | 0 | Unique identifier for the source of the content, to show what content the spatial part belong to |
| object_x | 6 | x-coordinate of the upper-left corner of the tile |
| object_y | 2 | y-coordinate of the upper-left corner of the tile |
| object_width | 1 | Width of the tile |
| object_height | 1 | Height of the tile |
| total_width | 17 | Total width of the content |
| total_height | 6 | Total height of the content |

In this respect, it is noted that the height and width may be defined on an (arbitrary) scale that is defined by the total height and width chosen for the content.

The following provides an example of a Media Presentation Description which references to the tiles. Here, first the entire VR video is described, with the SRD having been added in comma separated value pairs. The entire canvas is described, where the upper left corner is (0,0), the size of the tile is (17,6) and the size of the total content is also (17,6). Afterwards, the first four tiles (horizontally) are described.

```
<?xml version="1.0" encoding="UTF-8"?>
<MPD
    xmlns="urn:mpeg:dash:schema:mpd:2011"
    type="static"
    mediaPresentationDuration="PT10S"
    minBufferTime="PT1S"
    profiles="urn:mpeg:dash:profile:isoff-on-demand:2011">
    <ProgramInformation>
        <Title>Example of a DASH Media Presentation Description using Spatial Relationship
Description to indicate tiles of a video</Title>
    </ProgramInformation>
    <Period>
        <!-- Main Video -->
        <AdaptationSet segmentAlignment="true" subsegmentAlignment="true" subsegmentStartsWithSAP="1">
            <Role schemeIdUri="urn:mpeg:dash:role:2011" value="main"/>
            <SupplementalProperty schemeIdUri="urn:mpeg:dash:srd:2014" value="0,0,0,17,6,17,6"/>
            <Representation mimeType="video/mp4" codecs="avc1.42c01e" width="640" height="360" bandwidth="226597" startWithSAP="1">
                <BaseURL> full_video_small.mp4</BaseURL>
                <SegmentBase indexRangeExact="true" indexRange="837-988"/>
```

```
            </Representation>
            <Representation mimeType="video/mp4" codecs="avc1.42c01f" width="1280" height="720"
bandwidth="553833" startWithSAP="1">
                <BaseURL> full_video_hd.mp4</BaseURL>
                <SegmentBase indexRangeExact="true" indexRange="838-989"/>
            </Representation>
            <Representation mimeType="video/mp4" codecs="avc1.42c033" width="3840"
height="2160" bandwidth="1055223" startWithSAP="1">
                <BaseURL> full_video_4k.mp4</BaseURL>
                <SegmentBase indexRangeExact="true" indexRange="839-990"/>
            </Representation>
        </AdaptationSet>
        <!-- Tile 1 -->
        <AdaptationSet segmentAlignment="true" subsegmentAlignment="true"
subsegmentStartsWithSAP="1">
            <Role schemeIdUri="urn:mpeg:dash:role:2011" value="supplementary"/>
            <SupplementalProperty schemeIdUri="urn:mpeg:dash:srd:2014" value="0,0,0,1,1,17,6"/>
            <Representation mimeType="video/mp4" codecs="avc1.42c0d" width="640" height="360"
bandwidth="218284" startWithSAP="1">
                <BaseURL> tile1_video_small.mp4</BaseURL>
                <SegmentBase indexRangeExact="true" indexRange="837-988"/>
            </Representation>
            <Representation mimeType="video/mp4" codecs="avc1.42c01f" width="1280" height="720"
bandwidth="525609" startWithSAP="1">
                <BaseURL> tile1_video_hd.mp4</BaseURL>
                <SegmentBase indexRangeExact="true" indexRange="838-989"/>
            </Representation>
            <Representation mimeType="video/mp4" codecs="avc1.42c028" width="1920"
height="1080" bandwidth="769514" startWithSAP="1">
                <BaseURL> tile1_video_fullhd.mp4</BaseURL>
                <SegmentBase indexRangeExact="true" indexRange="839-990"/>
            </Representation>
        </AdaptationSet>
        <!-- Tile 2 -->
        <AdaptationSet segmentAlignment="true" subsegmentAlignment="true"
subsegmentStartsWithSAP="1">
            <SupplementalProperty schemeIdUri="urn:mpeg:dash:srd:2014" value="0,1,0,1,1,17,6"/>
...
        </AdaptationSet>
        <!-- Tile 3 -->
        <AdaptationSet segmentAlignment="true" subsegmentAlignment="true"
subsegmentStartsWithSAP="1">
            <SupplementalProperty schemeIdUri="urn:mpeg:dash:srd:2014" value="0,2,0,1,1,17,6"/>
...
        </AdaptationSet>
        <!-- Tile 4 -->
        <AdaptationSet segmentAlignment="true" subsegmentAlignment="true"
subsegmentStartsWithSAP="1">
            <SupplementalProperty schemeIdUri="urn:mpeg:dash:srd:2014" value="0,3,0,1,1,17,6"/>
...
        </AdaptationSet>
...
    </Period>
</MPD>
```

It will be appreciated that various other ways of describing parts of a VR video in the form of spatial relation data are also conceivable. For example, spatial relation data may describe the format of the video (e.g., equirectangular, cylindrical, unfolded cubic map, cubic map), the yaw (e.g., degrees on the horizon, from 0 to 360) and the pitch (e.g., from −90 degree (downward) to 90 degree (upward). These coordinates may refer to the center of a tile, and the tile width and height may be described in degrees. Such spatial relation data may allow for easier conversion from actual tracking data of a head tracker, which is also defined on this axis.

FIG. 19 shows an example of an equirectangular image divided in 6×17=102 tiles. A current viewport will only use a limited number of tiles at any given time, in this example it uses 9 tiles in a 3 by 3 layout. These numbers used here are arbitrary, any other division using the same approach may also be used in combination with this invention.

Figure 20:
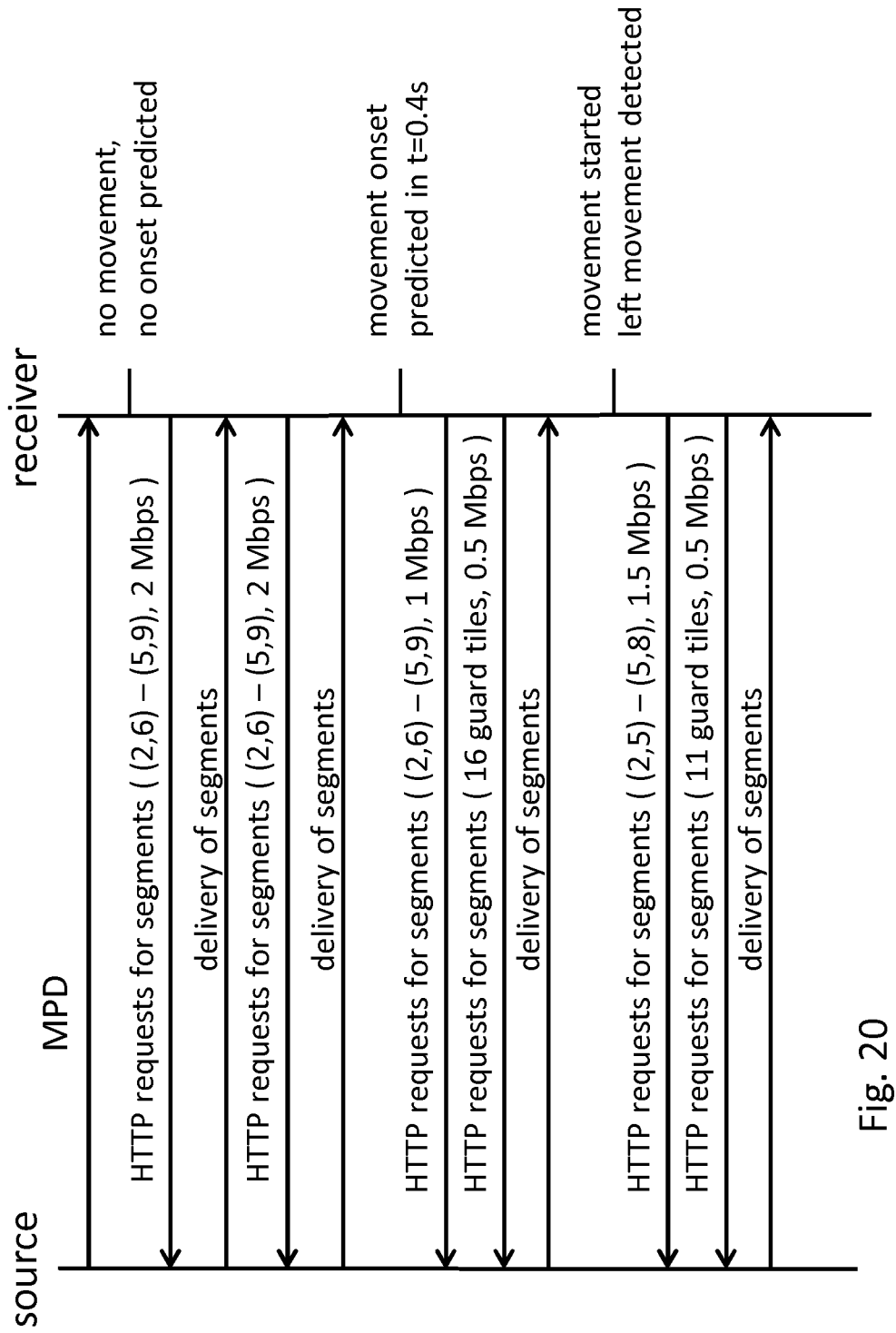
FIG. 20 shows tiled streaming process for a receiver and a source connected via a network.

FIG. 20 shows a tiled streaming process for a receiver and a source connected via a network. The receiver first retrieves an MPD. This MPD contains information on the various tiles, the bitrate they are available in (e.g. in this case 2 Mbps, 1.5 Mbps, 1 Mbps and 0.5 Mbps), the segments the media consists of (e.g. 1 second segments) and the URLs that may be used to retrieve the segments. In this example, initially no movement is going on, i.e. the user sits still and looks in one direction. Also, no movement onset is predicted, based on the EEG signals. Normally, the streaming process should have some way to deal with the sudden onset of movement. This may consist of a low resolution fallback layer continuously provided for the entire image, or of the delivery of guard band tiles surrounding the current viewport. But, since it is predicted that the head will remain stationary, this is not necessary, and only the tiles for the current viewport are requested. Thus, the best image quality can be attained given the current bandwidth.

Currently, for each tile and for each segment (i.e. 1 second segment) for that tile, a separate HTTP request will be sent, and the segment for that tile will be delivered in a separate HTTP response. For sake of simplicity, the figure shows the aggregation of this. For all tiles in the current viewport, i.e. as shown in FIG. 19, segments are retrieved at the highest quality, i.e. at 2 Mbps. This reflects a scenario in which e.g. 20 Mbps of bandwidth is available for the receiver for this streaming process. As long as no movement onset is detected, the receiver can continue to request new segments for these same tiles, as conceptually shown in the figure by repeating the same HTTP request.

Then, at a certain point in time, based on the EEG readings, movement onset is predicted. In this case, it is predicted that a head movement will start in 0.4 seconds, giving the receiver ample time to retrieve segments for new tiles. Because only movement onset is predicted, it is not known in advance in which direction the movement is going to be. To ensure that image data is available for movement in any direction, guard band tiles are requested next to the viewport tiles. Requesting a tile in this case means: request a time segment of image data for the spatial region. The streaming is limited in bandwidth to 20 Mbps, which in this situation means that the viewport quality will decrease to make bandwidth available for retrieval of guard band tile segments. This is shown in FIG. 20 in the next step, where the segments for the 9 viewport tiles are now requested at 1 Mbps and the 16 tiles surrounding the viewport, here called guard band tiles or short guard tiles, are requested at 0.5 Mbps. This will ensure that image data is available for head movement in any given direction.

Note that the movement onset is predicted in time here, but this may not coincide with segment borders in time. If the movement onset falls just within a new segment in time, those whole segments can be requested. If the movement onset falls somewhere in the middle of a segment or at the end of a segment, the viewport segments are already available for that time. In that case, only the guard band tiles need to be requested for that segment in time. MPEG DASH also allows for requesting partial segments by requesting byte ranges of data from within a segment. This allows for requesting only the temporal parts of the new tiles that are actually needed, from the movement onset prediction on. Still, a new tile, i.e. a tile not previously requested in time, will need an IDR frame (or I-Frame) to be able to start decoding. Whole segments will always start with such a frame, as they need to be independently decodable. When requesting partial segments through byte range requests, this needs to be kept in mind to first request a part containing an I-frame for new tiles. Other HTTP adaptive streaming methods such as HLS (HTTP Live Streaming, developed by Apple) support this also. Alternatively, each tile may also be available in a full-I-frame form, thereby allowing random access based on such a full-I-frame segment. Once a tile is accessed, new segments for that tile may request the regular intra-encoded segments for higher efficiency.

Further in FIG. 20, the actual movement is starting at a certain point in time. With other sensors, such as a gyroscope or an external sensor, the movement direction can be detected. Once the direction is known, the streaming can be further optimized by requesting only guard band tiles in certain directions, i.e. in this case to the left, up and down, as a complete reversal of head movement from left to right cannot happen instantaneously. As shown in FIG. 20 in the last 2 HTTP requests, movement has already started, the viewport has moved one tile to the left and only 11 guard band tiles (i.e. left, up and down) are still requested. This shows that the invention can be combined with regular movement detection as well, for further optimization.

Figure 21:
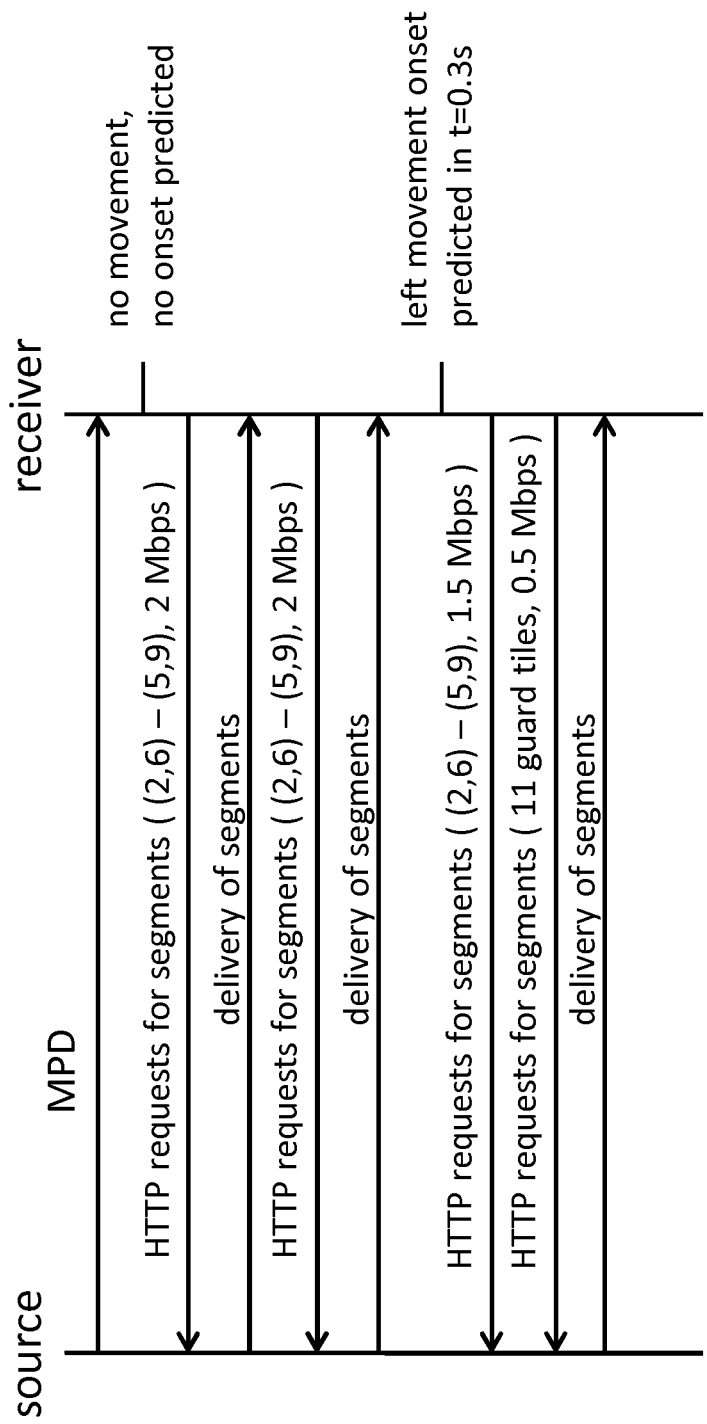
FIG. 21 shows another example of a tiled streaming process.

FIG. 21 shows another example of a tiled streaming process for a receiver and a source connected via a network. The first part of the figure is the same as FIG. 20, where the receiver gets an MPD and starts requesting segments of tiles based on no movement and no movement onset predicted. Here, at a certain point in time a movement onset is predicted in 0.3 seconds, and in this case a left movement is predicted. Because the direction of the movement is predicted, immediately guard band tiles in this direction can be retrieved, and not in the opposite direction. Because less guard band tiles are needed, more bandwidth can be used for the viewport tiles, thereby increasing the image quality for the end user.

Figure 22:
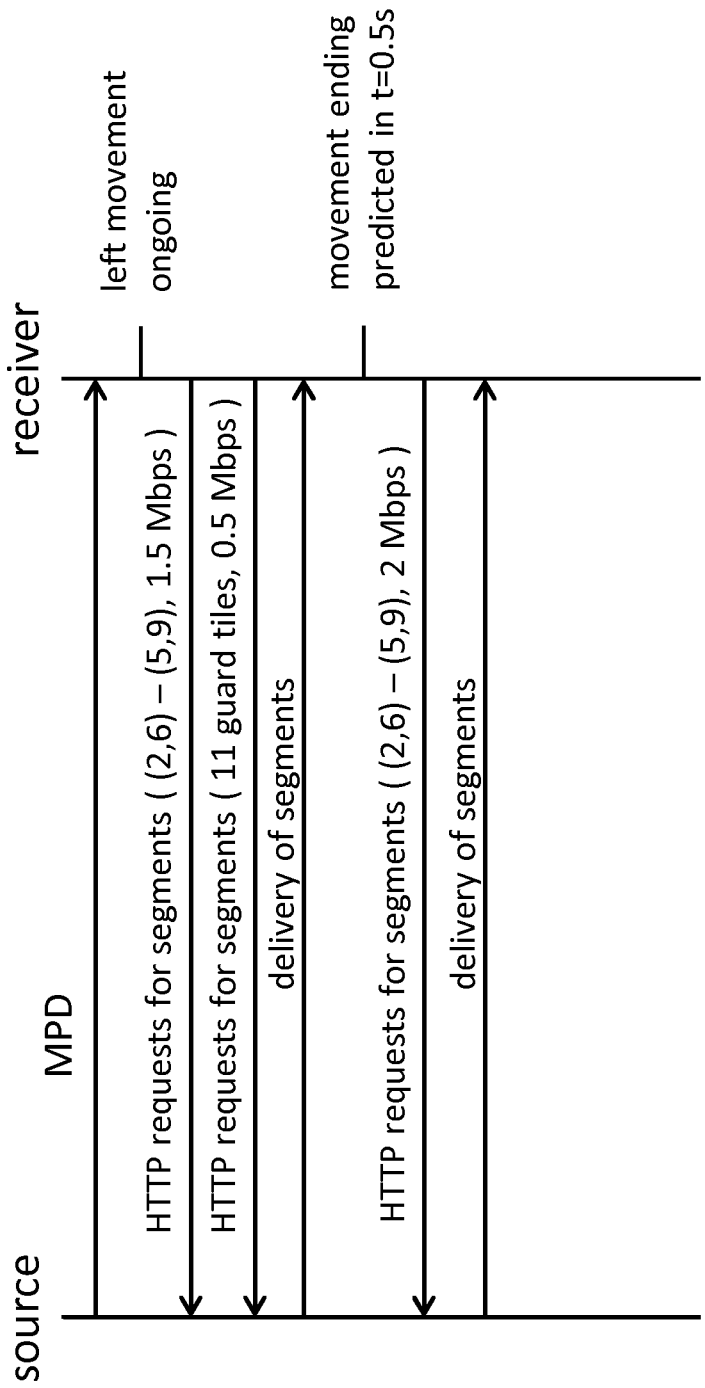
FIG. 22 shows a further example of a tiled streaming process.

FIG. 22 shows a further example of a tiled streaming process for a receiver and a source connected via a network. The figure is similar to FIG. 20, while now initially a left head movement is ongoing. The Figure illustrates what may be done when a movement ending is predicted. The receiver has received an MPD, and is currently in an ongoing left movement. Normally, it is not known how far a user will rotate his head. For example, a user may perform an ongoing leftward rotation even for more than 360 degrees. So, initially the receiver will request the viewport tiles and guard band tiles to the left, up and down, similar to FIG. 21. But, in this case, at a certain point in time the movement ending is predicted, predicting the movement will end in 0.5 seconds. For new segments, this means only the viewport tiles need to be requested, and guard band tiles are no longer necessary. Again, depending on the segment size and the timing of the prediction and the segment borders, this request for only the viewport segments can happen immediately, or some (parts of) segments for guard band tiles will also need to be retrieved (not shown here).

Figure 23:
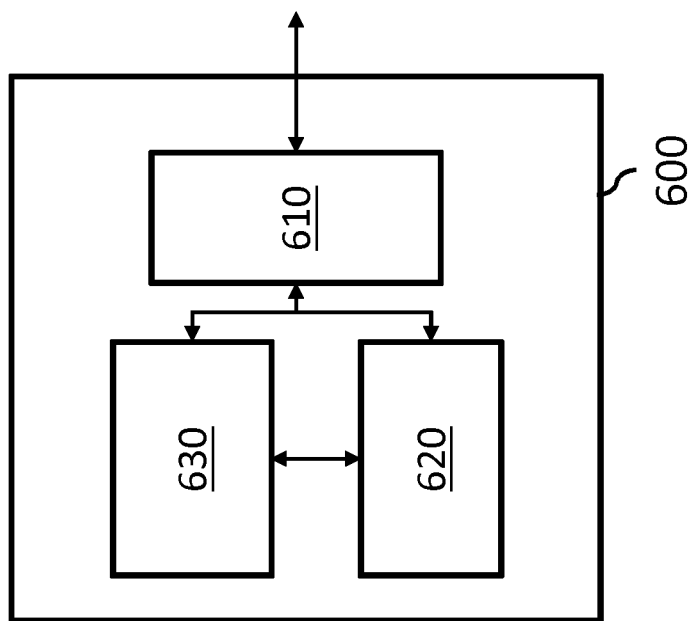
FIG. 23 shows an exemplary VR rendering device.

FIG. 23 shows an exemplary VR rendering device 600, which may comprise a network interface 610 for communicating with a network. The network interface may be, but is not limited to, an Ethernet or fiber optic-based local or wide area network (LAN, WAN) interface or a wireless interface, e.g., according to Wi-Fi, 4G or 5G telecommunication standards. The VR rendering device may further comprise a display processor 620 configured to render a selected view of the scene on the basis of one or more of the plurality of streams. Such display processors are known per se in the art, and may but do not need to include one or more Graphics Processing Units (GPUs). The VR rendering device may further comprise a controller 630 configured to perform the prediction of head movement based on EEG data acquired as described above from a brain signal detector, e.g. integrated in the HMD or connected via an USB interface. The controller is configured to execute the streaming process according to a first configured setup providing first image data needed to render the current view; to determine EEG data by measuring brain signals; to predict a head movement based on the EEG data; to determine target image data differing from the first image data and needed for rendering a future view based on the predicted head movement; to determine a second configured setup for providing the target image data; and to execute the streaming process according to the second configured setup.

The streaming process may comprise, in a video delivery chain, at least one or more of the following sub-processes: capturing image data, stitching together image data from multiple sources, encoding image data, encoding different versions of the same content for different viewports, while encoding image data for a view in a high resolution and encoding image data for other parts in lower resolution, packetizing image data into a stream, transporting a stream via a network, de-packetizing image data from a stream, buffering image data, decoding image data, displaying image data. The sub-processes as such are known in the field of VR processing, and may be controlled in accordance with the predicted head movement. Thereto, executing the second configured setup may further comprise controlling at least one of the sub-processes based on the predicted head movement.

It will be appreciated that the VR rendering device 600 may comprise one or more displays for displaying the rendered VR environment. For example, the VR rendering device may be a VR headset, e.g., referring to a head-mountable display device, or a smartphone or tablet device which is to be used in a VR enclosure, e.g., of a same or similar type as the 'Gear VR' or 'Google Cardboard'. Alternatively, the VR rendering device may be a device which is connected to a display or VR headset and which provides rendered images to the display or VR headset for display thereon. A specific example is that the VR rendering device may be represented by a personal computer or game console which is connected to a separate display or VR headset, e.g., of a same or similar type as the 'Oculus Rift', 'HTC Vive' or 'PlayStation VR'. Other examples of VR rendering devices are so-termed Augmented Reality (AR) devices that are able to play-out VR video, such as the Microsoft HoloLens.

Moreover, although not shown in FIG. 23, the VR rendering device may comprise one or more memories, which may be used for various purposes, including but not limited to storing data which may be received from the cache or the server.

It is noted that the VR rendering device may be aware of when to switch streams on the basis of a measured head rotation or head movement of a user. Here, 'switching streams' refers to at least a new stream being requested, and the streaming of a previous stream being ceased. It is noted that measuring the head rotation or head movement of a user is known per se in the art, e.g., using gyroscopes, cameras, etc. The head rotation or head movement may be measured by the VR rendering device itself, e.g., by comprising a gyroscope, camera, or camera input connected to an external camera recording the user, or by an external device, e.g., an external VR headset connected to the VR rendering device or an external camera recording the VR headset from the outside, e.g., using so-termed 'outside-in' tracking, or a combination thereof. Moreover, although the switching of streams may be in response to a head rotation or head movement, the invention as claimed is not limited thereto, as there may also be other reasons to render a different view of the panoramic scene and thereby to switch streams. For example, the switching of streams may be in anticipation of a head movement, e.g., because a sound associated with the VR video from a certain direction may trigger the user to rotate his head into that certain direction, with an oncoming occurrence of the sound triggering the switching.

Figure 24:
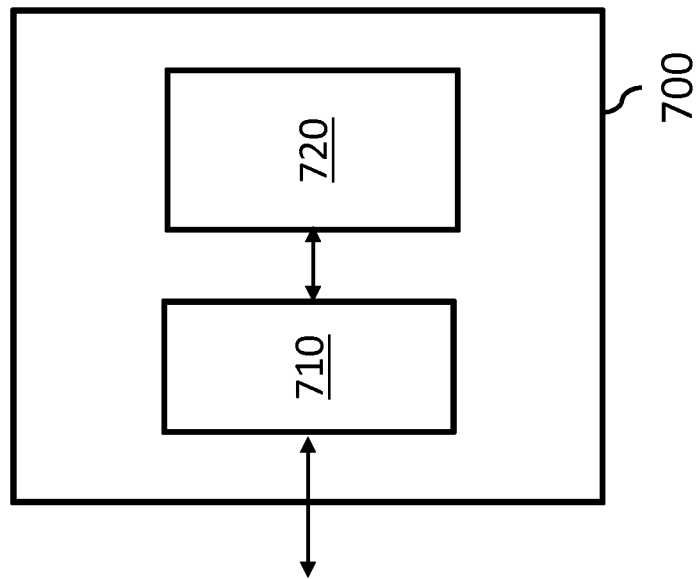
FIG. 24 shows an exemplary VR source.

FIG. 24 shows an exemplary VR source 700, which may comprise a network interface 710 for communicating with a network. The VR source also comprises a VR processor 720 to provide one or more streams of VR image data as described above. The VR processor may also be configured to receive the prediction data or prediction based control commands as described above, and to accordingly adapt the streaming process and or sub-processes in the VR source.

Figure 25:
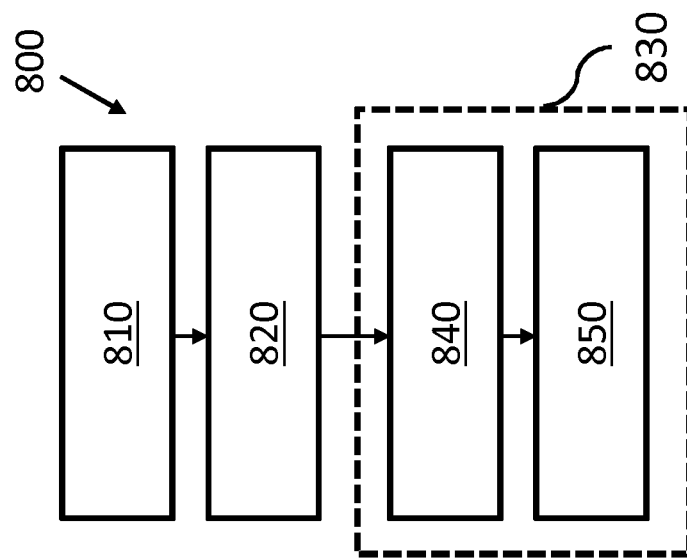
FIG. 25 shows a method 800 for use in a streaming process of a Virtual Reality [VR] video to a VR rendering device.

FIG. 25 shows a method 800 for use in a streaming process of a Virtual Reality [VR] video to a VR rendering device. The streaming process and the VR rendering device have been described above. The method may comprise, in an operation 810 titled INITIATE, initiating the streaming process, e.g. based on user commands and setting up a connection to a VR source. The method may comprise, in a next operation 820 titled EXECUTE, executing the streaming process according to a first configured setup, the streaming process providing first image data needed to render the current view. The method continues, in a next operation 840 titled PREDICT, by determining EEG data by measuring brain signals and predicting a head movement based on the EEG data. The method continues, in a next operation 850 titled TARGET, by determining target image data differing from the first image data and needed for rendering a future view based on the predicted head movement, and determining a second configured setup for providing the target image data. The operation 830, combining the EEG based prediction and updating the configure setup, may be performed repeatedly. After determining the new configured setup, the method continues, in operation 820 titled EXECUTE, by executing the streaming process according to the new configured setup. The method 800 may be implemented on a processor system, e.g., on a computer as a computer implemented method, as dedicated hardware, or as a combination of both.

Figure 26:
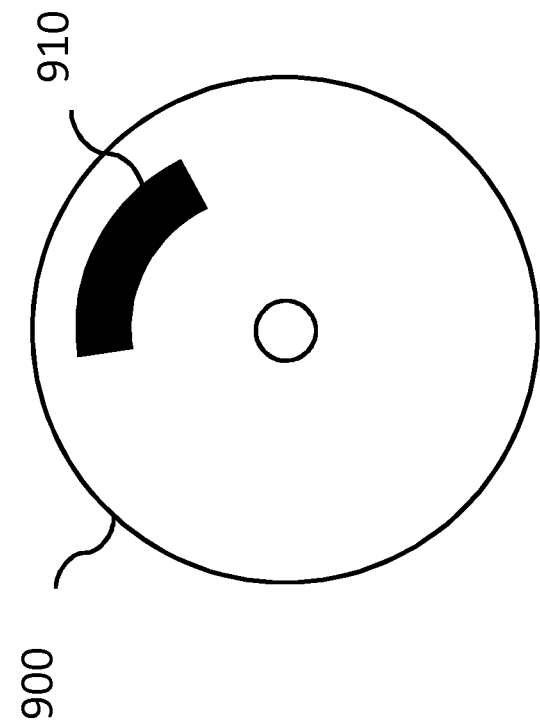
FIG. 26 shows a transitory or non-transitory computer-readable medium which may comprise a computer program comprising i) instructions for a processor system to perform the method, or ii) spatial relation data, or iii) stream metadata.

FIG. 26 shows a transitory or non-transitory computer readable medium, e.g. an optical disc 900. As also illustrated in FIG. 26, instructions for the computer, e.g., executable code, may be stored on the computer readable medium 900, e.g., in the form of a series 910 of machine readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. Also, the computer-readable medium 900 may comprise one or more streams of VR data, prediction metadata or spatial relation data as described elsewhere in this specification.

FIG. 27 shows a block diagram illustrating an exemplary data processing system that may be used in the embodiments of this disclosure. Such data processing systems include data processing entities described in this disclosure, including but not limited to the VR rendering device, the VR server and the VR source. Data processing system 1000 may include at least one processor 1002 coupled to memory elements 1004 through a system bus 1006. As such, the data processing system may store program code within memory elements 1004. Further, processor 1002 may execute the program code accessed from memory elements 1004 via system bus 1006. In one aspect, data processing system may be implemented as a computer that is suitable for storing and/or executing program code. It will be appreciated, however, that data processing system 1000 may be implemented in the form of any system including a processor and memory that is capable of performing the functions described within this specification.

Memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The processing system 1000 may also include one or more cache memories (not shown) that provide temporary storage of at least some program code in order to reduce the number of times program code must be retrieved from bulk storage device 1010 during execution.

Input/output (I/O) devices depicted as input device 1012 and output device 1014 may optionally be coupled to the data processing system. Examples of input devices may include, but are not limited to, for example, a microphone, a keyboard, a pointing device such as a mouse, a touchscreen or the like. Examples of output devices may include, but are not limited to, for example, a monitor or display, speakers, or the like. Input device and/or output device may be coupled to data processing system either directly or through intervening I/O controllers. A network adapter 1016 may also be coupled to, or be part of, the data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 27, memory elements 1004 may store an application 1018. It should be appreciated that the data processing system 1000 may further execute an operating system (not shown) that may facilitate execution of the application. The application, being implemented in the form of executable program code, may be executed by data processing system 1000, e.g., by the processor 1002. Responsive to executing the application, the data processing system may be configured to perform one or more operations to be described herein in further detail.

In one aspect, for example, the data processing system 1000 may represent a VR rendering device. In that case, the application 1018 may represent an application that, when executed, configures the data processing system 1000 to perform the various functions described herein with reference to the VR rendering device, or in general 'client', and its processor and controller. Here, the network adapter 1016 may represent an embodiment of the input/output interface of the VR rendering device. In another aspect, the data processing system 1000 may represent a network cache. In that case, the application 1018 may represent an application that, when executed, configures the data processing system 1000 to perform the various functions described herein with reference to the network cache and its cache controller.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method for use in a streaming process of a Virtual Reality [VR] video to a VR rendering device, the streaming process having a configurable setup, in each configured setup the VR video being represented by one or more streams and each configured setup providing respective different image data of a scene, the VR rendering device being arranged to render, on the basis of the one or more streams, a current view of the scene based on a current head position, wherein the method comprises:
   executing the streaming process according to a first configured setup providing first image data needed to render the current view;
   determining EEG data by measuring brain signals;
   predicting a head movement based on the EEG data;
   determining target image data differing from the first image data and needed for rendering a future view based on the predicted head movement;
   determining a second configured setup for providing the target image data; and
   executing the streaming process according to the second configured setup.

2. The method according to claim 1, wherein predicting a head movement comprises predicting a movement direction based on the EEG data, and
   determining the target image data is based on the predicted movement direction.

3. The method according to claim 1, the predicting a head movement further comprising at least one of:
   predicting a head movement due to a change of a focus of attention position based on the EEG data;
   predicting a yaw movement rotating the head around a vertical axis based on the EEG data;
   predicting a roll movement rotating the head around a view axis in a view direction based on the EEG data;
   predicting a pitch movement rotating the head around a lateral axis perpendicular to the view direction based on the EEG data;
   predicting a head translation based on the EEG data;
   predicting a head movement speed based on the EEG data;
   predicting a head movement acceleration based on the EEG data;
   predicting a head movement angle based on the EEG data.

4. The method according to claim 1, wherein
   predicting a head movement comprises
      predicting a movement onset based on the EEG data, and determining the second configured setup in dependence of the predicted movement onset; or
      predicting a movement ending based on the EEG data and
   determining the second configured setup in dependence of the predicted movement ending.

5. The method according to claim 1, wherein the target image data comprises a target area where the future view is expected and a guard area, and wherein determining the target image data comprises determining the guard area which is spatially adjacent to the target area.

6. The method according to claim 5, wherein determining the guard area further comprises at least one of:
   determining the guard area for accommodating a difference between the predicted head movement and an actual future head movement;
   determining the guard area in dependence of an estimated accuracy of the predicted head movement;
   adjusting the size of the guard area in dependence of the estimated accuracy of the predicted head movement, and reducing the size at increasing accuracies;
   adjusting the quality of the guard area in dependence of the estimated accuracy of the predicted head movement, and increasing the quality at increasing accuracies;
   determining the guard area spatially adjacent in all directions around the image data of the first configured setup based on a predicted movement onset while the movement direction is not yet predicted;

determining the guard area spatially adjacent in a subset of directions to the image data of the first configured setup corresponding to a predicted movement direction;

determining the guard area spatially adjacent in a left or right movement direction to the image data of the first configured setup when a horizontal head rotation and a corresponding movement direction are predicted;

determining the guard area spatially adjacent in a direction above or below of the image data of the first configured setup when a vertical head rotation and a corresponding movement direction are predicted.

7. The method according to claim 5, the determining the second configured setup further comprising at least one of:

having the second configured setup provide the image data for the guard area at a lower quality than the quality of the image data for the area corresponding to the current view;

having the second configured setup provide the image data for at least part of the target area at a lower quality than the image data of the current view according to the first configured setup when a head movement is predicted;

having the second configured setup provide at least part of the target area at a higher quality than the image data of the current view according to the first configured setup when a deceleration of head movement is predicted for the second configured setup.

8. The method according to claim 1, wherein the determining a second configured setup further comprises determining prediction data indicating at least one of the predicted head movement;
a predicted head movement direction;
a predicted head movement speed;
a predicted head movement acceleration;
a predicted head movement angle;
a predicted head movement onset;
a predicted head movement ending;
the target image data;
the future view; and
the streaming process comprises obtaining the VR video from or via a VR server and processing the VR video at the VR server to provide the one or more streams and executing the second configured setup comprises transferring the prediction data to the VR server for enabling the VR server to adapt processing of the VR video to provide the one or more streams according to the prediction data; or the streaming process comprises obtaining the VR video from a camera oriented towards the scene at a VR source, and the determining a second configured setup further comprises determining at least one command based on the prediction data, and executing the second configured setup further comprises transferring the command to the VR source to enable controlling the camera.

9. The method according to claim 1,
wherein the streaming process comprises obtaining the VR video from multiple locations, respective image data from the respective locations together constituting the scene and each location providing at least one respective stream, and wherein the determining the second configured setup further comprises including in the second configured setup a respective stream when the target image data comprises at least part of the respective image data; or the determining of a further configured setup comprises excluding from the further configured setup a respective stream when the target image data no longer comprises the respective image data.

10. The method according to claim 1,
wherein the streaming process comprises, in a video delivery chain, at least one of the sub-processes:
capturing image data,
stitching together image data from multiple sources,
encoding image data,
encoding different versions of the same content for different viewports, while in a respective version encoding image data for the respective viewport in high quality and encoding image data for other parts in lower quality,
packetizing image data into a stream,
transporting a stream via a network,
de-packetizing image data from a stream,
buffering image data, decoding image data,
displaying image data; and
executing the second configured setup further comprises controlling at least one of the sub-processes based on the predicted head movement.

11. The method according to claim 1, the predicting a head movement further comprising using a classification model to distinguish predictions of different head movements based on the EEG data; the method further comprising at least one of training the classification model using the EEG data in sample periods of a predetermined length preceding a predetermined head movement;

training the classification model based on head movement data derived from successive actual head orientations and corresponding predicted head movements;

providing from the model multiple graded outputs for multiple possible head movements and using the multiple graded outputs for determining the target image data.

12. The method according to claim 1, wherein determining the second configured setup comprises obtaining spatial relation data which is indicative of a spatial relation between respective different image data of the scene as provided by respective streams; and identifying, by using the spatial relation data, the one or more streams which are needed to provide the target image data.

13. A transitory or non-transitory computer-readable medium comprising a computer program, the computer program comprising instructions for causing a processor system to perform the method according to claim 1.

14. A Virtual Reality [VR] rendering device for rendering a VR video using a streaming process having a configurable setup, in each configured setup the VR video being represented by one or more streams and each configured setup providing respective different image data of a scene, wherein the VR rendering device comprises:
a receiver to receive the one or more streams according to a current configured setup; and
a display processor configured to render, on the basis of the one or more streams, a current view of the scene based on a current head position; and
a controller configured to:
execute the streaming process according to a first configured setup providing first image data needed to render the current view;

determine EEG data by measuring brain signals;
predict a head movement based on the EEG data;
determine target image data differing from the first image data and needed for rendering a future view based on the predicted head movement;
determine a second configured setup for providing the target image data; and
execute the streaming process according to the second configured setup.

15. The VR rendering device as claimed in claim 14, wherein the streaming process comprises processing, in the VR rendering device, at least one of the sub-processes:
retrieving the one or more streams from a local file in or near the VR rendering device,
stitching together image data from multiple streams,
de-packetizing image data from a stream,
buffering image data, decoding image data,
displaying image data; and
executing the second configured setup further comprises controlling at least one of the sub-processes based on the predicted head movement.

16. VR data structure for transferring VR data between the VR rendering device as claimed in claim 14 and a VR server, the VR data structure comprising prediction data indicating at least one of
the predicted head movement;
a predicted head movement direction;
a predicted head movement speed;
a predicted head movement acceleration;
a predicted head movement angle;
a predicted head movement onset;
a predicted head movement ending;
the target image data;
the second configured setup;
the future view;
which prediction data is based on a predicted head movement based on the EEG data.

17. VR server for providing or forwarding VR video to a VR rendering device as claimed in claim 14, wherein the VR server is arranged
to process the VR video to provide the one or more streams;
to receive, from the VR rendering device, a prediction data structure comprising prediction data indicating at least one of
the predicted head movement;
a predicted head movement direction;
a predicted head movement speed;
a predicted head movement acceleration;
a predicted head movement angle;
a predicted head movement onset;
a predicted head movement ending;
the target image data;
the second configured setup;
the future view;
which prediction data is based on a predicted head movement based on the EEG data; and
to adapt said processing of the VR video according to the prediction data.

* * * * *